US011642597B2

(12) United States Patent
Kwon et al.

(10) Patent No.: US 11,642,597 B2
(45) Date of Patent: May 9, 2023

(54) APPARATUS FOR RECOMMENDING GAME CONTENTS BASED ON THE PSYCHOLOGY OF A GAME USER AND AN OPERATION THEREOF

(71) Applicant: Sentience Inc., Seoul (KR)

(72) Inventors: Hyemin Kwon, Busan (KR); Insu Gim, Seoul (KR); Myunsoo Kim, Goyang-si (KR); Hyeyon Kwon, Yongin-si (KR)

(73) Assignee: Sentience Inc., Seoul (KR)

( * ) Notice: Subject to any disclaimer, the term of this patent is extended or adjusted under 35 U.S.C. 154(b) by 230 days.

(21) Appl. No.: 16/904,917

(22) Filed: Jun. 18, 2020

(65) Prior Publication Data

US 2020/0398166 A1    Dec. 24, 2020

(30) Foreign Application Priority Data

Jun. 21, 2019    (KR) .................. 10-2019-0073979

(51) Int. Cl.
*A63F 13/79* (2014.01)
*A63F 13/35* (2014.01)

(52) U.S. Cl.
CPC .............. *A63F 13/79* (2014.09); *A63F 13/35* (2014.09)

(58) Field of Classification Search
CPC .......... A63F 13/35; A63F 13/58; A63F 13/79; G06Q 30/0201; G06Q 20/065; G06Q 30/0631
See application file for complete search history.

(56) References Cited

U.S. PATENT DOCUMENTS 9,369,536 B1 *   6/2016   Holtzclaw .......... G06Q 30/0631

FOREIGN PATENT DOCUMENTS

| CN | 107866071 A | * | 4/2018 |
| KR | 1020090001419 A | | 1/2009 |
| KR | 1020150009635 A | | 1/2015 |

(Continued)

OTHER PUBLICATIONS

KR20160179900, machine translation (Year: 2018).*

(Continued)

*Primary Examiner* — James S. McClellan
*Assistant Examiner* — Ross A Williams
(74) *Attorney, Agent, or Firm* — Dinsmore & Shohl LLP; Yongsok Choi, Esq.

(57) ABSTRACT

Disclosed is a method of operating a server for recommending game content based on user information. The method includes extracting user log data including login information, character information, item usage information, billing information, play information, online money acquisition information, and online money usage information of a user from a game database, selecting the user's tendency information from among a plurality of pieces of tendency information on the basis of at least one piece of the user log data, determining recommended character information, recommended content information, or recommended item information on the basis of the user's tendency information, and controlling a user terminal to display the recommended character information, the recommended content information, or the recommended item information.

13 Claims, 16 Drawing Sheets

(56) References Cited

FOREIGN PATENT DOCUMENTS

| KR | 1020180075931 A | 7/2018 |
|----|-----------------|--------|
| KR | 1020190044316 A | 4/2019 |

OTHER PUBLICATIONS

CN-107866071-A Translation (Year: 2018).*
Office Action on Korean Patent Application No. 10-2019-0073979 dated Jun. 28, 2021.
Office Action on Korean Patent Application No. 10-2019-0073979 dated Nov. 30, 2020.

\* cited by examiner

APPARATUS FOR RECOMMENDING GAME CONTENTS BASED ON THE PSYCHOLOGY OF A GAME USER AND AN OPERATION THEREOF

CROSS-REFERENCE TO RELATED APPLICATION

This application claims priority to and the benefit of Korean Patent Application No. 10-2019-0073979, filed on Jun. 21, 2019, the disclosure of which is incorporated herein by reference in its entirety.

BACKGROUND

1. Field of the Invention

The present invention relates to a game content recommendation apparatus and an operating method therefor, and more particularly, to an apparatus and method for recommending game content according to users' tendencies.

2. Discussion of Related Art

Typically, games are widely used by the general public with various types of content and various details. Conventional games are used to provide various pastimes and amusements. In addition, games are provided to users while the users' tendencies for the games are classified as hardcore gamer, casual gamer, and the like or while the difficulty is classified as Hard, Normal, Easy, etc. In addition, games are classified according to age, gender, game genre, and the like.

Users have various personalities or tendencies that are difficult to express with limited game characters, but it is not easy to provide a game service to users who enjoy conventional games to allow users to enjoy the games according to the users' tendencies.

Also, there were cases where a game provider conducted a survey to learn users' tendencies, but it was not easy to understand the users' tendencies in a game due to the gap between the survey and the game.

Recently, along with the development of technology, an algorithm for providing a user with a user-specific advertisement in a game or for recommending content to a user based on artificial intelligence has been developed. However, in-game advertisements are not directly related to game progress, and thus there are cases where users feel tired. Also, an algorithm that recommends content to users based on artificial intelligence is machine-learned depending only on the purchase probability and thus cannot reflect the users' psychological states.

In addition, since games often form a structured story or event, users may feel repulsed or bored with the games when the game content does not fit the users' tendency or psychological state.

SUMMARY OF THE INVENTION

According to an aspect of the present invention, there is provided a method of operating a server for recommending game content using a user's psychology, the method including extracting user log data including login information, character information, item usage information, billing information, play information, online money acquisition information, and online money usage information of a user from a game database, selecting the user's tendency information from among a plurality of pieces of tendency information on the basis of at least one piece of the user log data, determining recommended character information, recommended content information, or recommended item information on the basis of the user's tendency information, and controlling a user terminal to display the recommended character information, the recommended content information, or the recommended item information.

The selecting of the user's tendency information may include determining information related to the ratio of the number of times the user plays in a Player Versus Player (PvP) mode to the total number of times the user plays on the basis of the number of times the user plays in the PvP mode, which is acquired from the play information, determining whether information related to the ratio is higher than a first reference value, determining whether information related to a win rate of the user in the PvP mode, which is acquired from the play information, is lower than a second reference value when the information related to the ratio is higher than the first reference value, and selecting a first user tendency indicating a social and extroverted tendency when the information related to the win rate is lower than the second reference value, and the determining of the recommended character information, the recommended content information, or the recommended item information may include determining, as the recommended character information, the recommended content information, or the recommended item information, identification information of characters, content, or items which are used by other users who have a higher win rate in the PvP mode than the user when the first user tendency is selected as the user's tendency information.

The selecting of the user's tendency information may include acquiring the number of times the user plays one of a plurality of characters owned by the user from the play information, acquiring the amount of online money used for an item that changes the appearance of the character from the online money usage information, determining whether information related to the number of characters owned by the user, which is acquired from the character information, is lower than a third reference value, determining whether information on the ratio of the number of times the user plays the character to the total number of times the user plays is higher than a fourth reference value, determining whether information related to the ratio of the amount of online money used for the item that changes the appearance of the character to the total amount of online money used by the user is higher than a fifth reference value when the information related to the number of characters owned by the user is lower than the third reference value and the information on the ratio is higher than the fourth reference value, and selecting a second user tendency indicating an individualistic and introverted tendency when the information related to the ratio of the amount of online money used for the item that changes the appearance of the character to the total amount is higher than the fifth reference value, and the determining of the recommended character information, the recommended content information, or the recommended item information may include determining identification information of content or an item related to a character used by the user as the recommended content information or the recommended item information when the second user tendency is selected as the user's tendency information.

The selecting of the user's tendency information may include acquiring information related to a use time of first content that provides online money from the play information, acquiring information related to a use time of second content that is available only a predetermined number of times per day from the play information, determining whether information related to the use time of the first content of the user is higher than a sixth reference value, determining whether information related to the use time of the second content is lower than a seventh reference value when the information related to the use time of the first content of the user is higher than the sixth reference value, and selecting a third user tendency indicating an individualistic and extroverted tendency when the information related to the use time of the second content of the user is lower than the seventh reference value, and the determining of the recommended character information, the recommended content information, or the recommended item information may include determining identification information of the second content or identification information of content other than the first content as the recommended content information when the third user tendency is selected as the user's tendency information.

The selecting of the user's tendency information may include determining whether information related to the number of times the user is billed, which is acquired from the billing information, is lower than an eighth reference value, determining whether information on the number of times the user has failed while playing first content, which is acquired from the play information, is higher than a ninth reference value when the information related to the number of times the user is billed is lower than the eighth reference value, and selecting a third user tendency indicating an individualistic and extroverted tendency when the information related to the number of times the user has failed while playing the first content is higher than the ninth reference value, and the determining of the recommended character information, the recommended content information, or the recommended item information may include determining identification information of second content different from the first content as the recommended content information when the third user tendency is selected as the user's tendency information.

The selecting of the user's tendency information may include acquiring the user's total play time from the play information, acquiring level information of the user's character from the character information, determining whether efficiency information acquired based on the total play time and the level information of the character is lower than a tenth reference value, determining whether information related to an amount charged to the user, which is acquired from the billing information, is higher than an eleventh reference value when the efficiency information is lower than the tenth reference value, and selecting a third user tendency indicating an individualistic and extroverted tendency when the information related to the amount charged to the user is higher than the eleventh reference value, and the determining of the recommended character information, the recommended content information, or the recommended item information may include determining identification information of a discount voucher allowing at least one item to be purchased with less online money than a market price as the recommended item information and determining identification information of content for which additional compensation is set as the recommended content information when the third user tendency is selected as the user's tendency information.

The selecting of the user's tendency information may include acquiring the amount of acquired online money from the online money acquisition information, acquiring the amount of used online money from the online money usage information, determining whether information related to the user's average daily play time, which is acquired from the play information, is lower than a twelfth reference value, determining whether information related to experience points acquired per the user's play time, which is acquired from the play information, is greater than a twenty-first reference value when the information related to the user's average daily play time is lower than the twelfth reference value, determining whether information related to the ratio of the amount of used online money to the amount of acquired online money is higher than a thirteenth reference value when the information related to the experience points acquired per the user's play time is greater than the twenty-first reference value, and selecting a third user tendency indicating an individualistic and extroverted tendency when the information related to the ratio of the amount of used online money to the amount of acquired online money is higher than the thirteenth reference value, and the determining of the recommended character information, the recommended content information, or the recommended item information may include determining identification information of an item for increasing an online money acquisition rate as the recommended item information when the third user tendency is selected as the user's tendency information.

The selecting of the user's tendency information may further include determining whether information related to the number of times the user has failed while playing content, which is acquired from the play information, is higher than a fourteenth reference value when the second user tendency is selected, determining whether a character used by the user is changed when the information related to the number of times the user has failed while playing the content is higher than the fourteenth reference value, maintaining the user's tendency information at the second user tendency when the character used by the user is not changed, and changing the user's tendency information from the second user tendency to a third user tendency indicating an individualistic and extroverted tendency when the character used by the user is changed, and the determining of the recommended character information, the recommended content information, or the recommended item information may further include determining identification information of content or an item related to one of a plurality of characters owned by the user as the recommended content information or the recommended item information when the user's tendency information is maintained at the second user tendency and determining identification information of a character, content, or an item related to the plurality of characters owned by the user as the recommended character information, the recommended content information, or the recommended item information when the user's tendency information is changed to the third user tendency.

The determining of the recommended content information or the recommended item information may include determining identification information of a character, content, and an item available only within a period from a login time to a logout time as the recommended character information, the recommended content information, or the recommended item information when a deviation of the login time of the user during a predetermined period of time or a deviation of the logout time of the user during the predetermined period of time, which is acquired from the login information, is lower than a twenty-second reference value.

The selecting of the user's tendency information may include determining whether information related to the user's play time during a predetermined period of time, which is acquired from the play information, is higher than a fifteenth reference value, determining whether information related to the user's item usage, which is acquired from the item usage information, is lower than a sixteenth reference value, selecting a second user tendency indicating an individualistic and introverted tendency when the information related to the user's play time during the predetermined period of time is higher than the fifteenth reference value and the information related to the user's item usage is lower than the sixteenth reference value, and selecting a third user tendency indicating an individualistic and extroverted tendency when the information related to the user's play time during the predetermined period of time is lower than the fifteenth reference value and the information related to the user's item usage is higher than the sixteenth reference value, and the determining of the recommended character information, the recommended content information, or the recommended item information may include determining identification information of content that provides at least one character or item to the user as the recommended content information when the second user tendency is selected as the user's tendency information, and determining identification information of the at least one item or the at least one character as the recommended item information or the recommended character information when the third user tendency is selected as the user's tendency information.

The selecting of the user's tendency information may include acquiring information about a first character currently being used by the user from the character information, computing the ratio of users who use the first character to all the users on the basis of the information about the first character, and selecting a second user tendency indicating an individualistic and introverted tendency when the ratio in use is lower than a twenty-third reference value, and the determining of the recommended character information, the recommended content information, or the recommended item information may include determining identification information of content or an item related to the first character as the recommended content information or the recommended item information when the second user tendency is selected as the user's tendency information.

The selecting of the user's tendency information may include determining whether information acquired based on the number of characters owned by the user, which is acquired from the character information, is higher than a seventeenth reference value, and selecting a second user tendency indicating an individualistic and introverted tendency when the information acquired based on the number of characters owned by the user is higher than the seventeenth reference value, and the determining of the recommended character information, the recommended content information, or the recommended item information may include determining identification information of at least one piece of content as the recommended content information.

The selecting of the user's tendency information may include acquiring information related to the number of attempts to play content being performed by the user from the play information, and determining whether the information related to the number of attempts is higher than an eighteenth reference value, the determining of the recommended character information, the recommended content information, or the recommended item information may include acquiring information related to a strategy for the content when the information related to the number of attempts is higher than the eighteenth reference value and the second user tendency or the third user tendency is selected as the user's tendency information, and determining identification information of at least one character or at least one item as the recommended character information or the recommended item information, and the controlling of the user terminal may include controlling the user terminal to display the information related to the strategy.

The selecting of the user's tendency information may include acquiring information related to a plurality of items used by the user from the item usage information, acquiring, as a first number of times, the number of pieces of item information other than predetermined item information among a plurality of pieces of item information used by the user on the basis of information related to the plurality of items used by the user, determining whether information related to a level variation with time, which is acquired from the character information, is lower than a nineteenth reference value, determining whether the ratio of the first number of times to the total number of items used by the user is higher than a twentieth reference value when the information related to the level variation with time is lower than the nineteenth reference value, and selecting a second user tendency indicating an individualistic and introverted tendency when the ratio of the first number of times is higher than the twentieth reference value, and the determining of the recommended character information, the recommended content information, or the recommended item information may include determining identification information of a discount voucher allowing at least one item to be purchased with less online money than a market price as the recommended item information when the second user tendency is selected as the user's tendency information.

Also, according to an aspect of the present invention, there is provided a computer-readable recording medium having a program recorded thereon for implementing a method of operating a server for recommending game content using a user's psychology.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
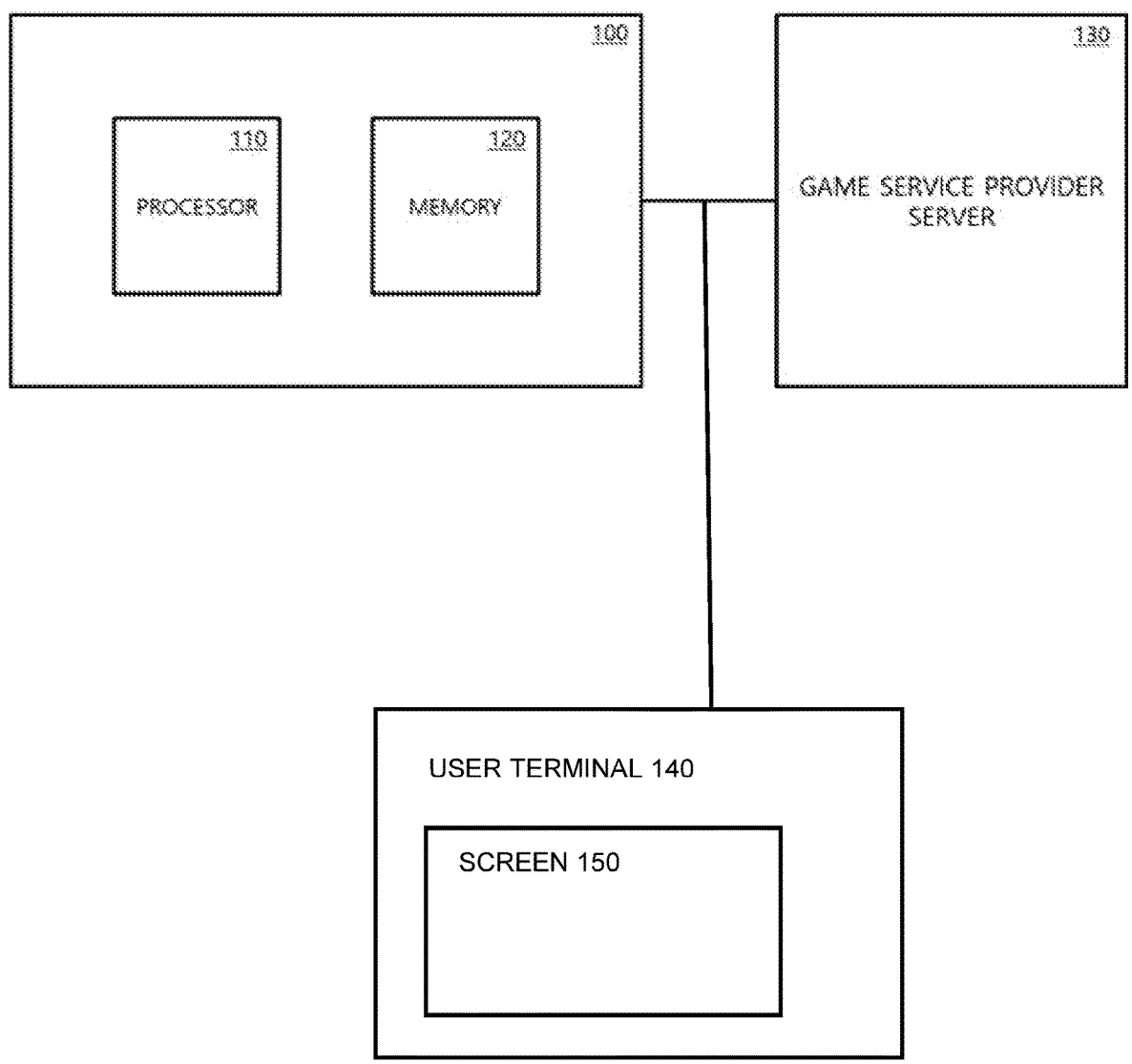
FIG. 1 is a diagram showing a server for recommending game content according to an embodiment of the present disclosure.

Advantages and features of the disclosed embodiments, and implementation methods thereof will be clarified through the following embodiments described with reference to the accompanying drawings. The present disclosure may, however, be embodied in different forms and should not be construed as limited to the embodiments set forth herein. Rather, these embodiments are provided so that this disclosure will be thorough and complete and will fully convey the scope of the present invention to those skilled in the art.

Terms used herein will be briefly described, and then exemplary embodiments will be described in detail below.

The terms used herein have been selected as general terms which are widely used at present in consideration of the functions of the present disclosure but may be altered according to the intent of an operator skilled in the art, conventional practice, or introduction of new technology. In addition, specific terms have been arbitrarily selected by the applicant and their meanings will be explained in detail in the corresponding description of the present invention. Therefore, the terms used herein should be defined on the basis of the overall content of the present disclosure instead of simply the names of the terms.

As used herein, the singular forms "a," "an," and "the" include the plural forms unless context clearly indicates otherwise. Also, the plural forms include the singular forms unless context clearly indicates otherwise.

Furthermore, when one part is referred to as "comprising" (or "including" or "having") other elements, it should be understood that the part can comprise (or include or have) only those elements or other elements as well as those elements unless specifically described otherwise.

As used herein, "information related to" any element refers to information calculated based on the element, an index corresponding to the element, information including the element, information having a linear relationship with the element, or information in which the element is included. The linear relationship may refer to a positive or inverse proportional relationship. The information may be numerical values or text.

The term "unit" used herein denotes a software or hardware element, and the "unit" performs any role. However, a "unit" is not limited to software or hardware. A "unit" may be configured to be in an addressable storage medium or to execute one or more processors. Accordingly, as an example, a "unit" includes elements such as software elements, object-oriented software elements, class elements, and task elements, processes, functions, attributes, procedures, subroutines, segments of program codes, drivers, firmware, micro-codes, circuits, data, database, data structures, tables, arrays, and variables. Furthermore, functions provided in elements and "units" may be combined as a smaller number of elements and "units" or further divided into additional elements and "units."

According to an embodiment of the present disclosure, a "unit" may be implemented with a processor and a memory. The term "processor" should be interpreted broadly to encompass a general-purpose processor, a central processing unit (CPU), a microcontroller, a digital signal processor (DSP), a controller, a microcontroller, a state machine, and so forth. Under some circumstances, a "processor" may refer to an application-specific integrated circuit (ASIC), a programmable logic device (PLD), a field-programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

Hereinafter, exemplary embodiments will be fully described with reference to the accompanying drawings in such a way that those skilled in the art can easily carry out the embodiments. Further, in order to clearly illustrate the present disclosure, parts not related to the description are omitted in the drawings.

FIG. 1 is a diagram showing a server for recommending game content according to an embodiment of the present disclosure.

A server 100 may include a processor 110 or a memory 120. The processor 110 may perform an operation on the basis of instructions stored in the memory 120. However, the present disclosure is not limited thereto, and the server 100 may include no memory but may include only the processor 110. The processor 110 may be set to output a preset signal through an output line for a preset period on the basis of an input signal. Each component of the server 100 may perform a preset operation according to a signal.

The server 100 may receive log data from a game service provider server 130, process the received log data, and transmit a result of the processing back to the game service provider server 130. For example, the server 100 may apply a predetermined criterion to a user's log data to determine which tendency of a plurality of tendencies the user has. Also, the server 100 may select at least one of a plurality of predetermined models on the basis of the user's log data. The server 100 may recommend content or an item to the user on the basis of the user's tendency or the selected model. Thus, a game service provider may provide a user with content and an item based on behavioral economics.

The game service provider server 130 may store a very large amount of log data in a raw database in a short time in real time. Log data is data associated with a user's (a gamer's) activity in a game. The log data is not processed and thus may be referred to as raw data. The log data included in the raw database may include game metadata, gameplay records, or data related to goods obtainable through play. The structure of the database or the content of the log data stored in the database may be different for each game. Also, the log data may contain data unnecessary for data processing of the server 100. Accordingly, one of the server 100 or the game service provider server 130 may select data to be used for data processing, extract only the selected data, and create a new database. The new database may include users' login information, character information, billing information, play information, online money acquisition information, and online money usage information.

In detail, the log data may be stored in one database and may be stored in a plurality of databases according to data attributes, data creation dates, and the like. The server 100 or the game service provider server 130 may integrate the log data stored in the plurality of databases.

Also, the server 100 or the game service provider server 130 may extract necessary data from the integrated log data and create a new database. The server 100 or the game service provider server 130 may use a predetermined algorithm in order to create a new database. The server 100 or the game service provider server 130 may transform the value of the raw data into a standardized value that can be processed by the server 100 on the basis of the predetermined algorithm. Also, the server 100 or the game service provider server 130 may transform the structure of the raw database including the raw data into the standardized structure of the database on the basis of the predetermined algorithm.

The server 100 may analyze the user's tendency on the basis of the at last one piece of the data included in the new database and may determine recommended character information, recommended item information, and recommended content information according to a result of the analysis. The server 100 or the game service provider server 130 may communicate with a user terminal 140. The server 100 or the game service provider server 130 may control the user terminal 140 to display the recommended character information, the recommended content information, or the recommended item information on a screen 150.

The operation of the server 100 will be described in detail below.

Figure 2:
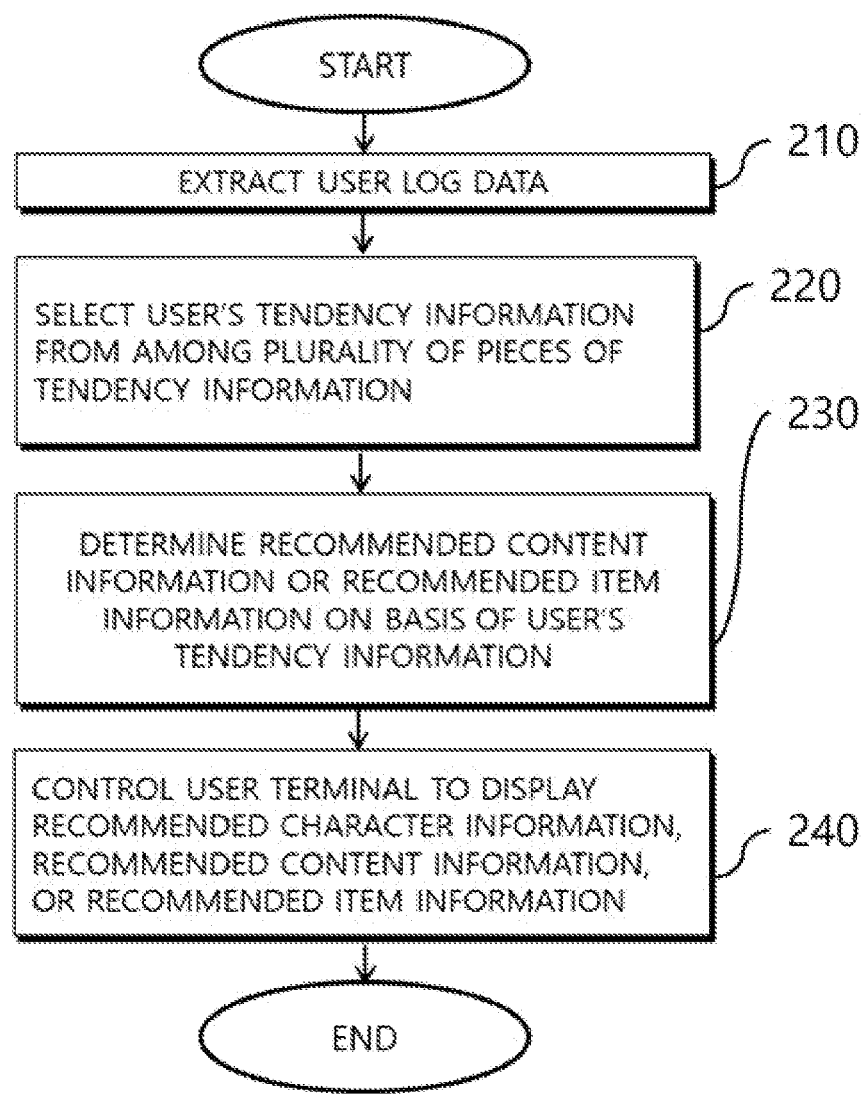
FIG. 2 is a flowchart showing an operation of a server to recommend game content using a user's psychology according to an embodiment of the present disclosure.

FIG. 2 is a flowchart showing an operation of a server to recommend game content using a user's psychology according to an embodiment of the present disclosure.

The server 100 may perform an operation of extracting user log data including a user's login information, character information, item usage information, billing information, play information, online money acquisition information, and online money usage information from a game database (210).

The game database may refer to a raw database. The game database may include raw data. The server 100 may extract user log data necessary for analysis from the game database. The server 100 may create a new database on the basis of the extracted log data. The server 100 may store the new database in the memory 120.

The user's login information is information about the user's logging in or out of a game service. The user's login information may include at least one of the user's login time or the user's logout time. The database of the server 100 may include the user's login time and logout time for a predetermined period.

The user's character information is information related to a game character owned by the user. The game service may provide at least one or more characters, and the user may own at least one of the provided characters.

The character information may include at least one of information related to the number of characters owned by the user, information about the current level of a character owned by the user, information related to a level variation over time of a character owned by the user, identification information of a character owned by the user, or identification information of a character currently being used among the characters owned by the user.

Each of the characters owned by the user may level up while the user is playing the game. The game service provides a reward, which indicates experience points, for the character when the user is playing the game, and the character may level up according to the experience points. The information about the current level of a character owned by the user may include information related to the current experience points or information about the current level. The information about the current level and the information related to the current experience points may be expressed with real numbers.

The information related to a level variation over time of a character owned by the user may indicate a development rate of the character owned by the user. For example, the level variation over time may indicate a change in the level of a character with respect to a duration for which the user uses the game service. Also, the level variation over time may indicate a change in the level of a character from when the user starts to use the game service. Also, the level variation over time may indicate a change in the level of a character with respect to the number of times the user plays the game. Also, the level variation over time may indicate a change in the level of a character with respect to the number of times the user plays the game using the corresponding character. The number of times the user plays the game may be determined assuming that one time is defined as a cycle from when the user attempts a predetermined goal provided by the service to when it is determined whether the goal is achieved.

The game service may provide a plurality of characters. Each of the plurality of characters may correspond to the identification information. The character information may include identification information of a character owned by the user. Also, when the user holds a plurality of characters, the character information may include identification information of a character currently being used by the user among the plurality of characters.

The item usage information may include information related to a user's item usage or information related to a plurality of items used by the user.

The items refer to various consumables provided by the game service. When the user uses an item, the character's physical strength value may be increased, the character's experience point value may be increased, the character's level value may be increased, or the character's ability point value may be increased. However, the present disclosure is not limited thereto, and the game service may provide various functional items if necessary.

The information related to the user's item usage may refer to the number of items used by the user. The number of items used by the user may refer to the number of times used for a specific period. The server 100 may acquire the number of items used by the user for various periods of time in order to analyze the user's tendency.

The information related to a plurality of items used by the user may refer to a usage history of an item used by the user. Alternatively, the information related to a plurality of items used by the user may refer to a list of the identification information of the item used by the user. Alternatively, the information related to a plurality of items used by the user may refer to the identification information of the item used by the user and the number of times the user uses the item corresponding to the identification information.

The billing information may include information related to the number of times the user is billed or information related to the billing amount for the user. The billing refers to a game service provider charging a user a fee in return for providing a game service. Through the billing, the user may purchase at least one of items, content, and characters that can be used in the game.

The information related to the number of times the user is billed may be a value proportional to the number of times the user pays money to the game service company. Also, the information related to the billing amount for the user may be a value proportional to the amount paid by the user to the game service company.

The play information may be information related to the user's history of using content in the game. The play information may include information related to what content the user has played, the difficulty of the content, whether the user wins or loses with respect to the content, experience points obtained when winning, and a play time.

In addition, the play information may include at least one of information about the number of times the user plays in Player Versus Player (PvP) mode, information related to a win rate in the PvP mode, information about the number of times the user plays one of the characters owned by the user, information related to a time during which one piece of content is used, information related to the number of failures while playing the content, information related to the number of attempts to play the content, information related to the user's average play time per day, or information related to the user's total play time.

A Player Versus Player (PvP) mode represents a mode in which users compete against each other in a game. A Player Versus Environment (PvE) mode represents a mode in which users compete against game environments (here, referring to artificial intelligence for providing a game service). Game content is largely classified as the PvP mode and the PvE mode.

Information about the number of times the user plays in the PvP mode is information corresponding to the number of times the user plays the PvP mode. The server 100 may determine a cycle from when the user enters the PvP mode to when a winning or losing result is output as one time playing.

The information related to a win rate in the PvP mode may be information related to the ratio of the number of times the user wins in the PvP mode to the number of times the user plays the PvP mode. The information related to a win rate may refer to a win rate for a predetermined period. The predetermined period may include 1 day, 1 week, 4 weeks, 1 month, 1 year, or the like. The information related to the win rate in the PvP mode may have a proportional relationship with the proportion.

The information about the number of times the user plays one of the characters owned by the user may be stored in a separate database for each character owned by the user. The user may play the game using one character. The server 100 may determine a cycle from when the user starts the game using one character to when a result of the game is output as one time playing.

The game service provider may provide content to the user. The content refers to various entertainments provided by the game service provider to the user. For example, the content may be largely classified as the PvE mode or the PvP mode. The PvE mode or the PvP mode may be further classified into various subdivided modes. Also, the content may include content that provides online money, content that provides items, or content that is available only a predetermined number of times per day depending on characteristics.

The information related to a time during which one piece of content is used may be stored for each piece of content. The time during which one piece of content is used may refer to an accumulation of time from when the user plays the content to when a result is output. The information related to a time during which one piece of content is used may be proportional to a time during which the content is used.

The information related to the number of attempts to play the content indicates information related to the number of times the user attempts one piece of content included in the PvE mode or the PvP mode. The information related to the number of attempts to play the content may be stored for each piece of content. The number of attempts to play the content indicates the number of times the user plays the content. The information related to the number of attempts to play the content may have a value proportional to the number of attempts to play the content.

The information related to the number of failures while playing the content indicates information related to the number of times the result, which is output after the user attempts the content, is a failure. The information related to the number of failures of the content may be stored for each piece of content. The number of failures indicates the number of times the result obtained when the user plays the content is a failure. The information related to the number of failures while playing the content may have a value proportional to the number of failures while playing the content.

The user's average play time per day may indicate an average time per day during which the user uses the game service. The information related to the user's average play time per day may be information proportional to the average play time per day.

The user's total play time may indicate the total time accumulated until the user logs out of the game service after logging in to the game service. The information related to the user's total play time may be information proportional to the total play time.

The online money acquisition information may include at least one of information about the amount of acquired online money, information about the time of acquisition of the online money, and information about the reason for the acquisition of the online money.

Online money is an exchange means for purchasing items, content, etc. in a game and is a measure of exchange value for goods or services. Users may acquire online money through various routes. For example, a user may acquire online money after paying the amount charged by the game service provider, acquire online money after playing the content, or acquire online money from another user.

When the user acquires the online money, information related to the acquisition may be recorded in a database as online money acquisition information. For example, a database may include at least one of the information about the amount of acquired online money, the information about the time of acquisition of the online money, or the information about the reason for the acquisition of the online money. The acquisition reason may be expressed by an index. That is, the index may include at least one of an index indicating that online money is acquired from another user, an index indicating that online money is acquired after the content is played, and an index indicating that online money is acquired after the charged amount is paid.

The online money usage information may include at least one of information about the amount of used online money, information about the use time of online money, and information about content, an item, or the like acquired using online money.

Users may acquire various items or pieces of content using the online money. For example, a user may use the online money to purchase an item for decorating a character, purchase an item for increasing a character's ability points, or purchase a right to use specific content. When the user uses the online money, information related to the use may be recorded in a database as online money usage information. For example, the database may include at least one of information about the amount of used online money, information about the use time of online money, and information about content, an item, or the like acquired using online money. The information about content, an item, or the like acquired using online money may be expressed by an index. That is, the index may include at least one of an index indicating that one item has been acquired or an index indicating that one piece of content has been acquired.

The server 100 may perform an operation of selecting a user's tendency information from among a plurality of pieces of tendency information on the basis of at least one piece of user log data (220). The server 100 may divide the user's tendency information into at least three pieces. Also, the server 100 may provide the user with a recommended item or recommended content using one of a plurality of models.

The server 100 may perform an operation of determining recommended character information, recommended content information, or recommended item information on the basis of the user's tendency information (230). Operations 220 and 230 will be described in detail below with reference to FIG. 3 and subsequent drawings.

Also, the server 100 may further perform an operation of determining a recommended goal on the basis of the user's tendency information. The game service provider server 130 may provide various benefits to the user when the user achieves the recommended goal. The server 100 may deliver the recommended goal to the user terminal through the game service provider server 130. Since the recommended goal motivates the user to play the game, the server 100 may allow the user to immerse himself or herself in the game.

The server 100 may perform an operation of controlling the user terminal 140 to display the recommended character information, the recommended content information, or the recommended item information on the screen 150 (240). The user can use a recommended character, recommended content, or a recommended item displayed on the user terminal for free. Alternatively, the user can pay less online money than the market price to use the recommended character, recommended content, or recommended item displayed on the user terminal.

The server 100 may transmit the recommended character information, the recommended content information, or the recommended item information to the game service provider server 130. The recommended character information, the recommended content information, or the recommended item information may be an index of an actual character, an index of actual content, or an index of an actual item which is used in the game service provider server 130. However, the present disclosure is not limited thereto. The recommended character information, the recommended content information, or the recommended item information may be an index corresponding to the actual character, the actual content, and the actual item or may be information indicating the characteristics of the actual content or the actual item. The game service provider server 130 may analyze the recommended character information, the recommended content information, or the recommended item information to acquire actual content information or actual item information.

The server 100 may transmit only information related to the user's tendency to the game service provider server 130. The game service provider server 130 may determine the actual character information, the actual content information, or the actual item information to be provided to the user on the basis of a signal received from the server 100. Also, the game service provider server 130 may transmit the actual content information or the actual item information to the user terminal.

The user may input whether to use the character information, the content information, or the item information displayed on the user terminal. An input signal may be provided to the server 100. The server 100 may additionally analyze the user's tendency on the basis of the user's input on whether to use the character information, the content information, or the item information.

The server 100 may allow the user to enjoy the game for a long time by allowing the user to use the recommended character, recommended content, or recommended item.

Figure 3:
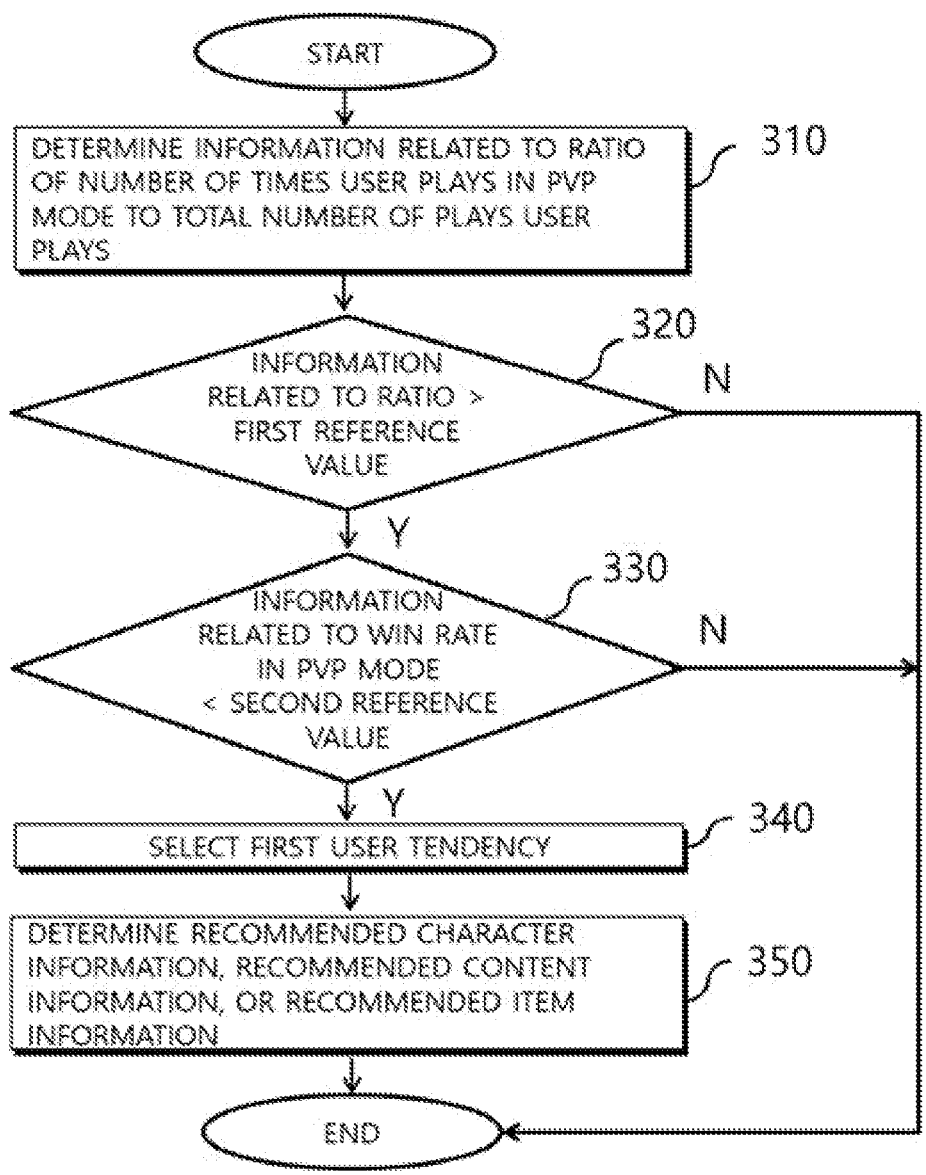
FIG. 3 is a flowchart showing a first model for providing game content information or game item information using a user's psychology according to an embodiment of the present disclosure.

FIG. 3 is a flowchart showing a first model for providing game content information or game item information using a user's psychology according to an embodiment of the present disclosure.

FIG. 3 is a flowchart for specifically describing FIG. 2 in detail according to the first model. The first model may target social and extroverted users who win by leveling up characters better than other users. A user may try to strengthen a character in order to enjoy the PvP mode and win in the PvP mode. The server 100 may recommend, to the user who enjoys the PvP mode, a character used by another user who is similar to the user but has a higher win rate.

The server 100 may perform an operation of determining information related to the ratio of the number of times the user plays the PvP mode to the total number of times the user plays (310) on the basis of the number of times the user plays the PvP mode, which is acquired from the play information, in order to perform the operation of selecting the user's tendency information (220), which is shown in FIG. 2. Here, the total number of times refers to the number of times the user plays the content for a predetermined period. The predetermined period may include one day, one week, four weeks, one month, one year, or the like from the present time point. One time may refer to a cycle from when the content is played to when the play result is output.

The server 100 may acquire the information about the number of times the user plays the PvP mode from the play information. The server 100 may acquire the information about the total number of times the user plays from the play information. The server 100 may acquire the information related to the ratio of the number of times the user plays the PvP mode to the total number of times the user plays. The information related to the ratio may be a value representing the ratio, an index corresponding to the ratio, or a value proportional to the ratio.

The server 100 may perform an operation of determining whether the information related to the ratio is higher than a first reference value (320). The first reference value may refer to a threshold value used to determine a user's tendency. The first reference value may be a predetermined value. That is, the server 100 may use the first reference value prestored in the memory. However, the present disclosure is not limited thereto. The server 100 may determine the first reference value on the basis of a variety of information stored in the database. The server 100 may determine the first reference value to be different depending on the user and over time. For example, the server 100 may determine, as the first reference value, the ratio of the number of times other users who use a game service play the PvP mode to the total number of times the user plays.

When the information related to the ratio is higher than the first reference value, the server 100 may perform an operation of determining whether information related to the user's win rate in the PvP mode, which is acquired from the play information, is lower than a second reference value (330).

The information related to the user's win rate in the PvP mode may be included in the play information. The win rate in the PvP mode may be a win rate in the PvP mode from when the user signs up for the game service to the present. However, the present disclosure is not limited thereto. The server 100 may compute the user's win rate in the PvP mode from a specific past time point to the present. For example, the server 100 may compute a win rate for the last year, month, week, or day. Also, for example, the server 100 may compute a win rate, while the user plays the game, for the last 10 times, 100 times, or 1000 times.

The second reference value may refer to a threshold value used to determine a user's tendency. The second reference value may be a predetermined value. That is, the server 100 may use the second reference value prestored in the memory. However, the present disclosure is not limited thereto. The server 100 may determine the second reference value on the basis of a variety of information stored in the database. The server 100 may determine the second reference value to be different depending on the user and over time. For example, the server 100 may determine, as the second reference value, the average of win rates in the PvP mode of other users who use the game service.

When the information related to the win rate is lower than the second reference value, the server 100 may perform an operation of selecting a first user tendency indicating a social and extroverted tendency (340). Also, the server 100 may determine recommended character information, recommended item information, or recommended content information for the user according to the first model.

When the first user tendency is selected as the user's tendency information, the server 100 may control the user terminal to display a message related to the user's tendency or a message related to the corresponding model. For example, the message related to the user's tendency may include at least one of a text message indicating that the user is social and extroverted, a text message indicating that the user is individualistic and extroverted, or a text message indicating that the user is individualistic and introverted. Also, the message related to the corresponding model may include a message indicating that the user has been classified according to one of a plurality of models. Also, when the user's tendency is classified according to the first to fourteenth models, the server 100 may control the user terminal to display a different message for each of the first to fourth models.

The user's tendency may include a first user tendency, a second user tendency, and a third user tendency. The first user tendency may indicate a social and extroverted tendency. Also, the second user tendency may indicate an individualistic and introverted tendency. The third user tendency may indicate an individualistic and extroverted tendency. The server 100 may select one of the first user tendency, the second user tendency, and the third user tendency.

The user tendency may be expressed by an index. For example, the first user tendency may correspond to "0," the second user tendency may correspond to "1," and the third user tendency may correspond to "2." However, the present disclosure is not limited thereto and may be set in various ways. The server 100 may determine recommended content, a recommended character, or a recommended item on the basis of the user's tendency information.

When the first user tendency is selected as the user's tendency information, the server 100 may perform an operation of determining identification information of characters, content, or items that are being used by other users who have higher win rates in the PvP mode than the user as the recommended character information, the recommended content information, or the recommended item information (350). Operation 350 may be included in operation 230 of FIG. 2.

The server 100 may determine a user who has a higher win rate than the current user on the basis of the database. The server 100 may determine the recommended content information or the recommended item information on the basis of information on content that is being played by the user who has a higher win rate than the current user or information on an item that is being used by the user who has a higher win rate than the current user.

The information on content that is being played by the user who has a higher win rate or the information on an item that is being used by the user who has a higher win rate may be expressed by an index. The index may have a numerical or text value.

The recommended character information, the recommended content information, or the recommended item information may refer to a variable in a programming language. The server 100 may assign a predetermined value to the recommended character information, the recommended content information, or the recommended item information by the above method. For example, the server 100 may assign character information, content information, or item information associated with the play of the user who has a higher win rate to the recommended character information, the recommended content information, or the recommended item information.

Figure 4:
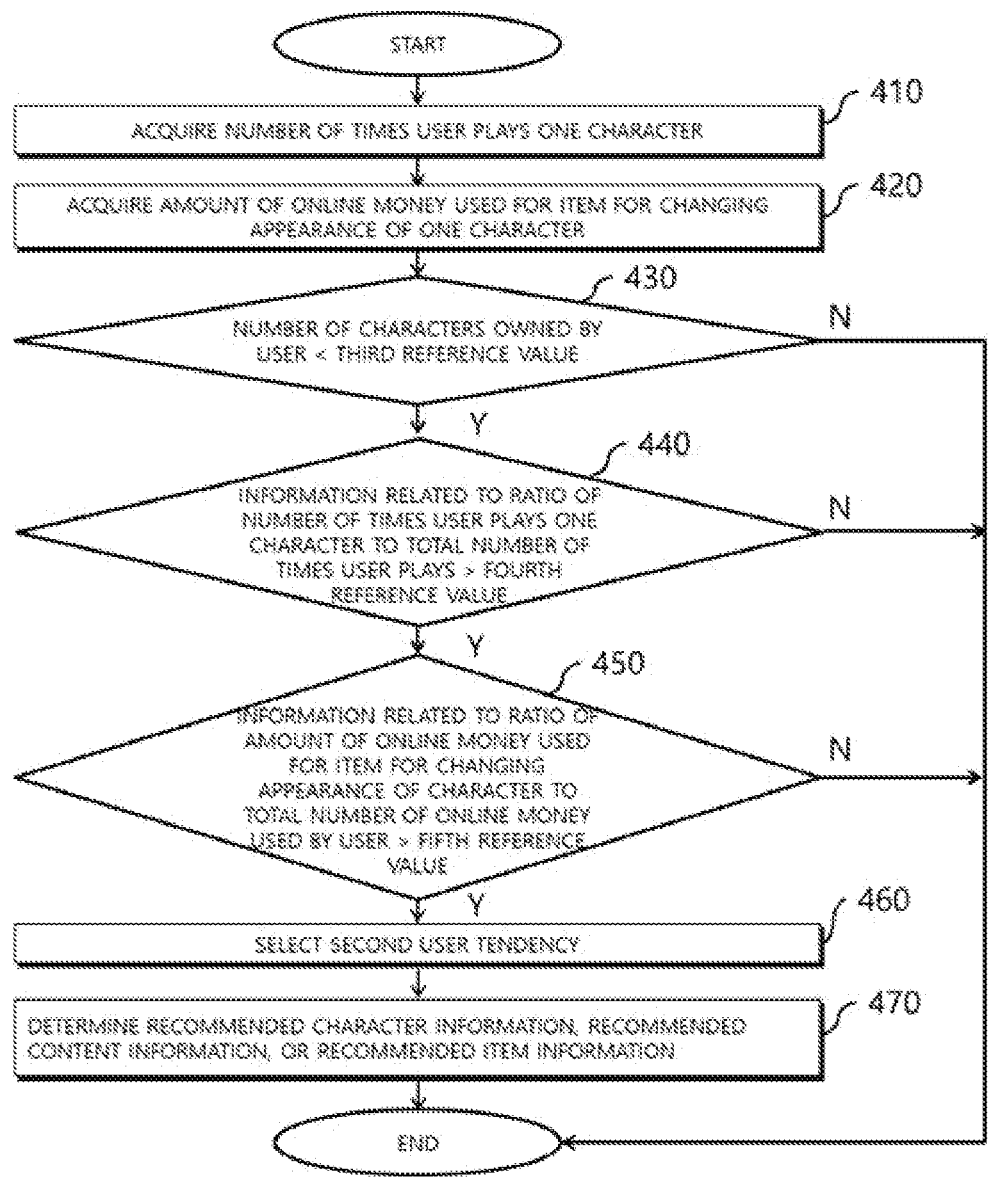
FIG. 4 is a flowchart showing a second model for providing game content information or game item information using a user's psychology according to an embodiment of the present disclosure.

FIG. 4 is a flowchart showing a second model for providing game content information or game item information using a user's psychology according to an embodiment of the present disclosure.

FIG. 4 is a flowchart for specifically describing FIG. 2 according to the second model. The second model may target users who value visual items. The second model may use the tendency of an individualistic and introverted user who values character clothes or decorative effects. The server 100 may increase game immersion by providing a user to be analyzed with content that can satisfy psychological needs.

The server 100 may perform an operation of acquiring the number of times the user plays one of the characters owned by the user from the play information (410) in order to perform the operation of selecting the user's tendency information (220), which is shown in FIG. 2.

The server 100 may perform an operation of acquiring the amount of online money used for an item that changes the appearance of one character from the online money usage information (420). The item that changes the appearance of the character may be one type of item that changes the appearance of one character and that can be used in a game. For example, the item that changes the appearance of the character may be associated with weapons, clothes, caps, shoes, and ornaments for the character. The item that changes the appearance of the character may have unique identification information. The server 100 may assign the identification information of the item that changes the appearance of the character to the user's account, and the user may use, for the character, the assigned item that changes the appearance of the character. For example, the user may purchase the item that changes the appearance of the character using online money. The server 100 may assign the identification information of the item that changes the appearance of the character to the account of the user who has purchased the item. The user may apply the assigned item that changes the appearance of the character to the character. Also, the server 100 may acquire the amount of online money used by the user to purchase the item that changes the appearance of the character.

The server 100 may perform an operation of determining whether the information related to the number of characters owned by the user, which is acquired from the character information, is lower than a third reference value (430). The server 100 may acquire the information related to the number of characters owned by the user in order to determine whether the user feels affinity with a few or all of the characters. The information related to the number of characters owned by the user may have a value proportional to the number of characters owned by the user.

The third reference value may refer to a threshold value used to determine a user's tendency. The third reference value may be a predetermined value. That is, the server 100 may use the third reference value prestored in the memory. However, the present disclosure is not limited thereto. The server 100 may determine the third reference value on the basis of a variety of information stored in the database. The server 100 may determine the third reference value to be different depending on the user and over time. For example, the server 100 may determine, as the third reference value, the average of the numbers of characters owned by other users who use the game service.

The server 100 may perform an operation of determining whether the information related to the ratio of the number of times the user plays one character to the total number of times the user plays is higher than a fourth reference value (440). The server 100 may acquire the information related to the ratio of the number of times the user plays one character to the total number of times the user plays in order to determine whether the user primarily uses a few favorite characters. The information related to the ratio may have a value proportional to a value of the ratio.

The fourth reference value may refer to a threshold value that is used to determine a user's tendency. The fourth reference value may be a predetermined value. That is, the server 100 may use the fourth reference value prestored in the memory. However, the present disclosure is not limited thereto. The server 100 may determine the fourth reference value on the basis of a variety of information stored in the database. The server 100 may determine the fourth reference value differently depending on the user and over time. For example, the server 100 may determine, as the fourth reference value, the average of the information related to the ratio of the number of times the user plays one character to the total number of times other users play.

When the information related to the number of characters owned by the user is lower than the third reference value and the information related the ratio is higher than the fourth reference value, the server 100 may perform an operation of determining whether information related to the amount of online money used for an item for changing the appearance of a character to the total amount of online money used by the user is higher than a fifth reference value (S450). In order to determine how much online money users use to decorate a character that the user often plays, the server 100 may acquire the information related to the ratio of the amount of online money used for an item for changing the appearance of a character to the total amount of online money used by the user. The server 100 may determine how attached the user is to a specific character through the operation 450.

The fifth reference value may refer to a threshold value used to determine a user's tendency. The fifth reference value may be a predetermined value. That is, the server 100 may use the fifth reference value prestored in the memory. However, the present disclosure is not limited thereto. The server 100 may determine the fifth reference value on the basis of a variety of information stored in the database. The server 100 may determine the fifth reference value differently depending on the user and over time. For example, the server 100 may determine, as the fifth reference value, the average of the number of types of items which are used by other users to change the appearance of a character.

When the information related to the ratio of the amount of online money used for an item that changes the appearance of a character to the total amount is greater than the fifth reference value, the server 100 may perform an operation of selecting a second user tendency indicating an individualistic and introverted tendency (460). When the second user tendency is selected as the user's tendency information, the server 100 may control the user terminal to display a message related to the user's tendency or a message related to the corresponding model.

The server 100 may perform the operation of determining the recommended character information, recommended content information, or recommended item information (230), which is shown in FIG. 2, according to the second model. When the second user tendency is selected as the user's tendency information, the server 100 may perform an operation of determining identification information of content or an item related to a character that is being used by the user as the recommended content information or the recommended item information (470).

The server 100 may determine the degree of attachment of the user to his or her primarily used character on the basis of the third reference value, the fourth reference value, and the fifth reference value. The server 100 may store, in the database, identification information of content or an item available for each character. The server 100 may acquire identification information of content or an item available for a character that is primarily used by the user on the basis of the database. The server 100 may determine the identification information of the content or item related to the user's character as the recommended content information or the recommended item information. According to the present disclosure, the server 100 may make the user feel more attached to his or her character. Accordingly, it is possible for the user to immerse himself or herself in the game.

Figure 5:
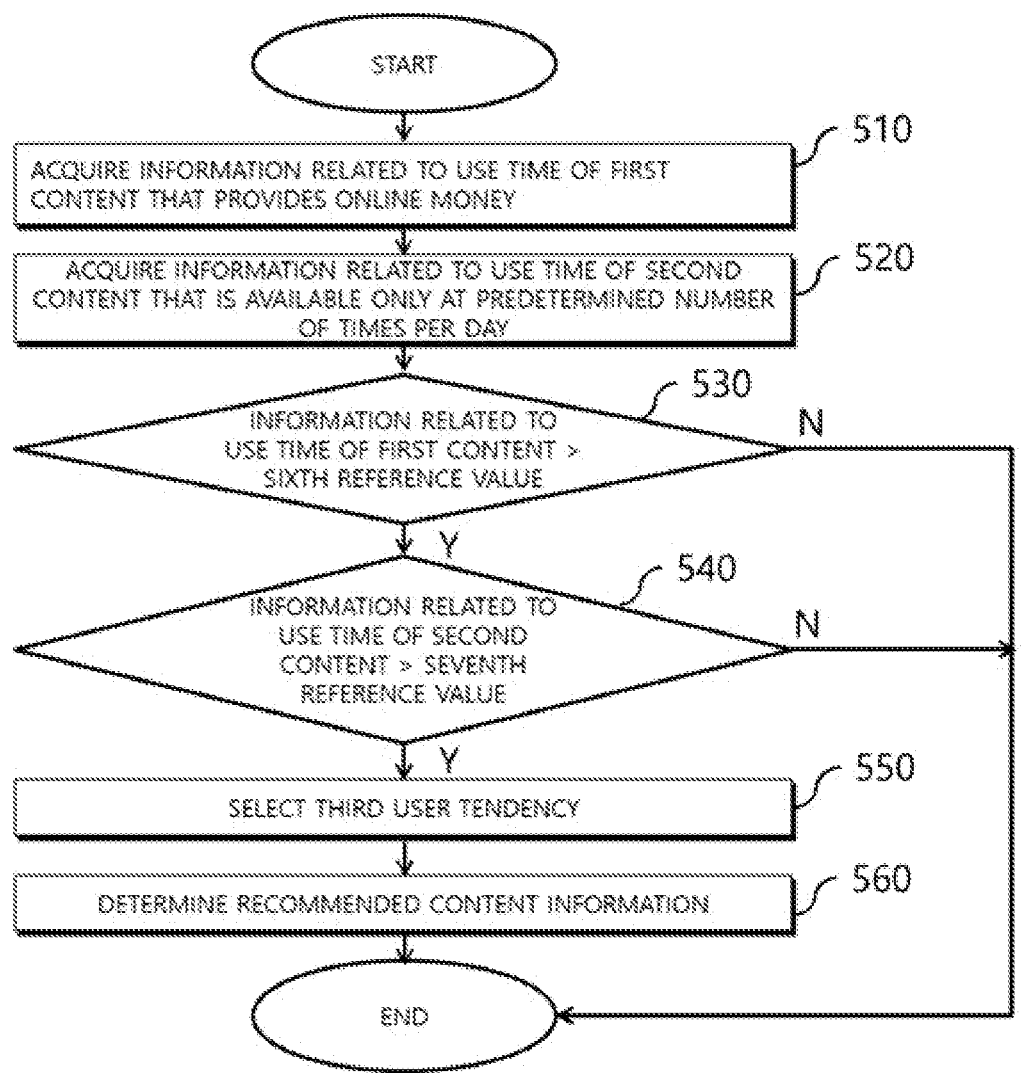
FIG. 5 is a flowchart showing a third model for providing game content information or game item information using a user's psychology according to an embodiment of the present disclosure.

FIG. 5 is a flowchart showing a third model for providing game content information or game item information using a user's psychology according to an embodiment of the present disclosure.

FIG. 5 is a flowchart for specifically describing FIG. 2 according to the third model. The third model may target users who prefer items that can be acquired without payment. The user does not make a payment, but may quit the game because the game does not satisfy his or her extroverted tendency. The server 100 may present different content to the user on the basis of the third model, thereby making the user aware that he or she can enjoy the game sufficiently without payment.

The server 100 may perform an operation of acquiring information related to the use time of first content for providing online money from play information (510) in order to perform the operation of selecting the user's tendency information (220) which is shown in FIG. 2. The content may be variously classified, and information for classifying the content may be stored for each piece of the content in the database. The server 100 may determine the first content among the pieces of the content on the basis of the database. The first content is content that provides online money to the user's account after content play. The server 100 may acquire information related to the time during which the user has played the first content on the basis of the database.

The server 100 may perform an operation of acquiring information related to the use time of second content that can be used only a predetermined number of times from the play information. The content may be variously classified, and information for classifying the content may be stored for each piece of the content in the database. The server 100 may determine the second content among the pieces of the content on the basis of the database. The second content is limited content so that a user can use the content only a predetermined number of times per day. For example, the game service provider server 130 may provide the user's account with a certain point that must be spent within a day. When the user plays the second content, the game service provider server 130 may deduct the points. When all points in the user's account are consumed, the user may no longer enjoy the second content.

The server 100 may perform an operation of determining whether the information related to the use time of the first content of the user is higher than a sixth reference value (530). The server 100 may determine whether the user uses the first content for a long time on the basis of the operation 530.

The sixth reference value may refer to a threshold value used to determine a user's tendency. The sixth reference value may be a predetermined value. That is, the server 100 may use the sixth reference value prestored in the memory. However, the present disclosure is not limited thereto. The server 100 may determine the sixth reference value on the basis of a variety of information stored in the database. The server 100 may determine the sixth reference value differently depending on the user and over time. For example, the server 100 may determine, as the sixth reference value, the average of the use times of the first content of other users.

When the information related to the use time of the first content of the user is higher than the sixth reference value, the server 100 may perform an operation of determining whether the information related to the use time of the second content is lower than a seventh reference value (540). The server 100 may determine whether the user uses the second content for a long time on the basis of the operation 540.

The seventh reference value may refer to a threshold value used to determine a user's tendency. The seventh reference value may be a predetermined value. That is, the server 100 may use the seventh reference value prestored in the memory. However, the present disclosure is not limited thereto. The server 100 may determine the seventh reference value on the basis of a variety of information stored in the database. The server 100 may determine the seventh reference value differently depending on the user and over time. For example, the server 100 may determine, as the seventh reference value, the average of the use times of the second content of other users.

When the information related to the use time of the second content of the user is lower than the seventh reference value, the server 100 may perform an operation of selecting a third user tendency indicating an individualistic and extroverted tendency (550). When the third user tendency is selected as the user's tendency information, the server 100 may control the user terminal to display a message related to the user's tendency or a message related to the corresponding model.

The server 100 may perform the operation of determining the recommended character information, recommended content information, or recommended item information (230), which is shown in FIG. 2, according to the third model. When the third user tendency is selected as the user's tendency information, the server 100 may perform an operation of determining identification information of the second content or identification information of content other than the first content as the recommended content information (560). According to the present disclosure, the user may enjoy the second content that has not been enjoyed so far. Also, it can be seen that the user does not necessarily have to pay the charged amount to enjoy the game by enjoying the content other than the first content.

Figure 6:
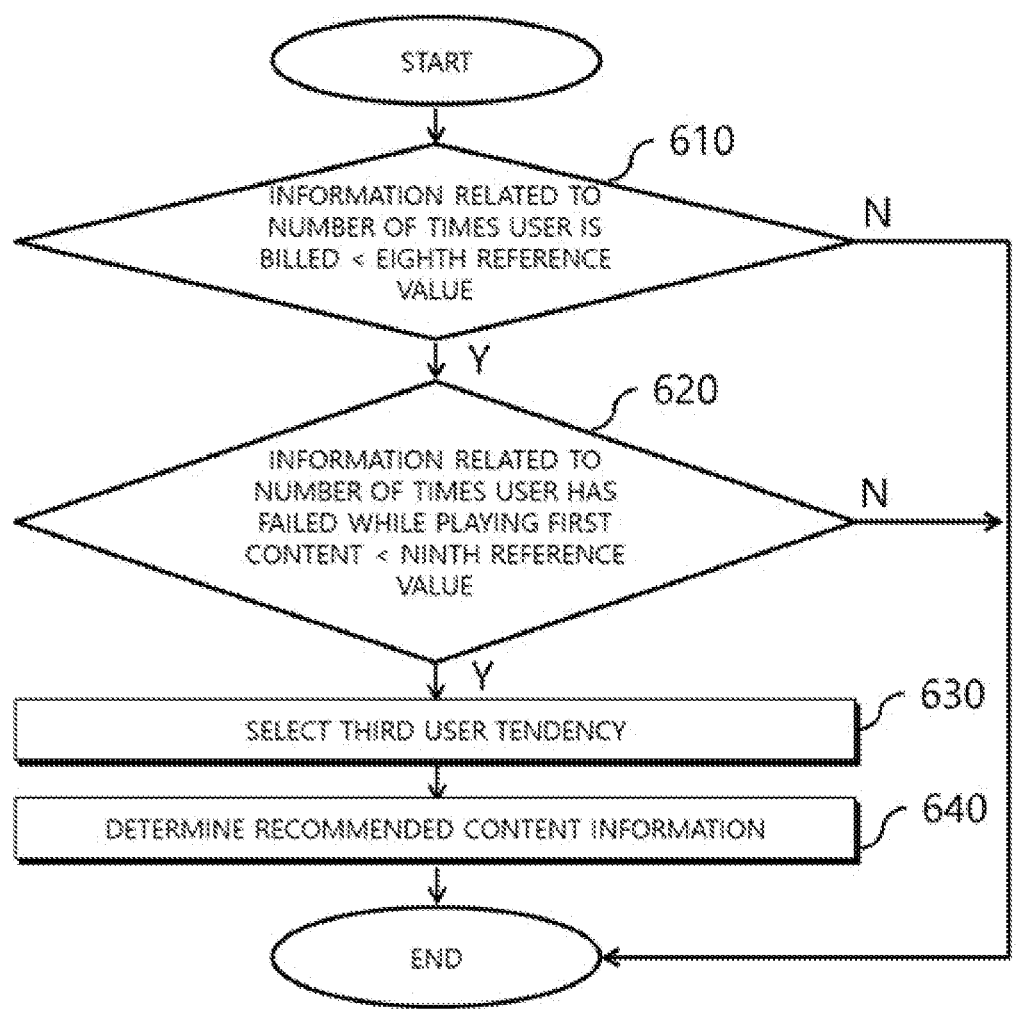
FIG. 6 is a flowchart showing a fourth model for providing game content information or game item information using a user's psychology according to an embodiment of the present disclosure.

FIG. 6 is a flowchart showing a fourth model for providing game content information or game item information using a user's psychology according to an embodiment of the present disclosure.

FIG. 6 is a flowchart for specifically describing FIG. 2 according to the fourth model. The fourth model is aimed at users who have no intention of paying the charged amount and have the expectation of unpaid play content that can be obtained even without paying the charged amount. Users tend to quit the game when they encounter game content for which payment has to be made while playing the game earlier than expected. The server 100 may induce the user to play other content on the basis of the fourth model.

The server 100 may perform an operation of determining whether information related to the number of times the user is billed, which is acquired from the billing information, is lower than an eighth reference value (610) in order to perform the operation of selecting the user's tendency information (220), which is shown in FIG. 2.

The eighth reference value may refer to a threshold value used to determine a user's tendency. The eighth reference value may be a predetermined value. That is, the server 100 may use the eighth reference value prestored in the memory. However, the present disclosure is not limited thereto. The server 100 may determine the eighth reference value on the basis of a variety of information stored in the database. The server 100 may determine the eighth reference value differently depending on the user and over time. For example, the server 100 may determine, as the eighth reference value, the average of the numbers of times other users are billed.

When the information related to the number of times the user is billed is lower than the eighth reference value, the server 100 may perform an operation of determining whether information related to the number of times the user has failed while playing the first content, which is acquired from the play information, is higher than a ninth reference value (620).

The ninth reference value may refer to a threshold value used to determine a user's tendency. The ninth reference value may be a predetermined value. That is, the server 100 may use the ninth reference value prestored in the memory. However, the present disclosure is not limited thereto. The server 100 may determine the ninth reference value on the basis of a variety of information stored in the database. The server 100 may determine the ninth reference value differently depending on the user and over time. For example, the server 100 may determine, as the ninth reference value, the average of the numbers of times other users have failed while playing the first content.

When the information related to the number of times the user has failed while playing the first content is higher than the ninth reference value, the server 100 may perform an operation of selecting a third user tendency indicating an individualistic and extroverted tendency (630). When the third user tendency is selected as the user's tendency information, the server 100 may control the user terminal to display a message related to the user's tendency or a message related to the corresponding model.

The server 100 may perform the operation of determining the recommended character information, recommended content information, or recommended item information (230), which is shown in FIG. 2, according to the fourth model. When the third user tendency is selected as the user's tendency information, the server 100 may perform an operation of determining identification information of the second content different from the first content as the recommended content information (640). According to the present disclosure, the user may have an opportunity to enjoy content other than the first content without quitting the game. Accordingly, it is possible for the user to enjoy the game for a longer time.

Figure 7:
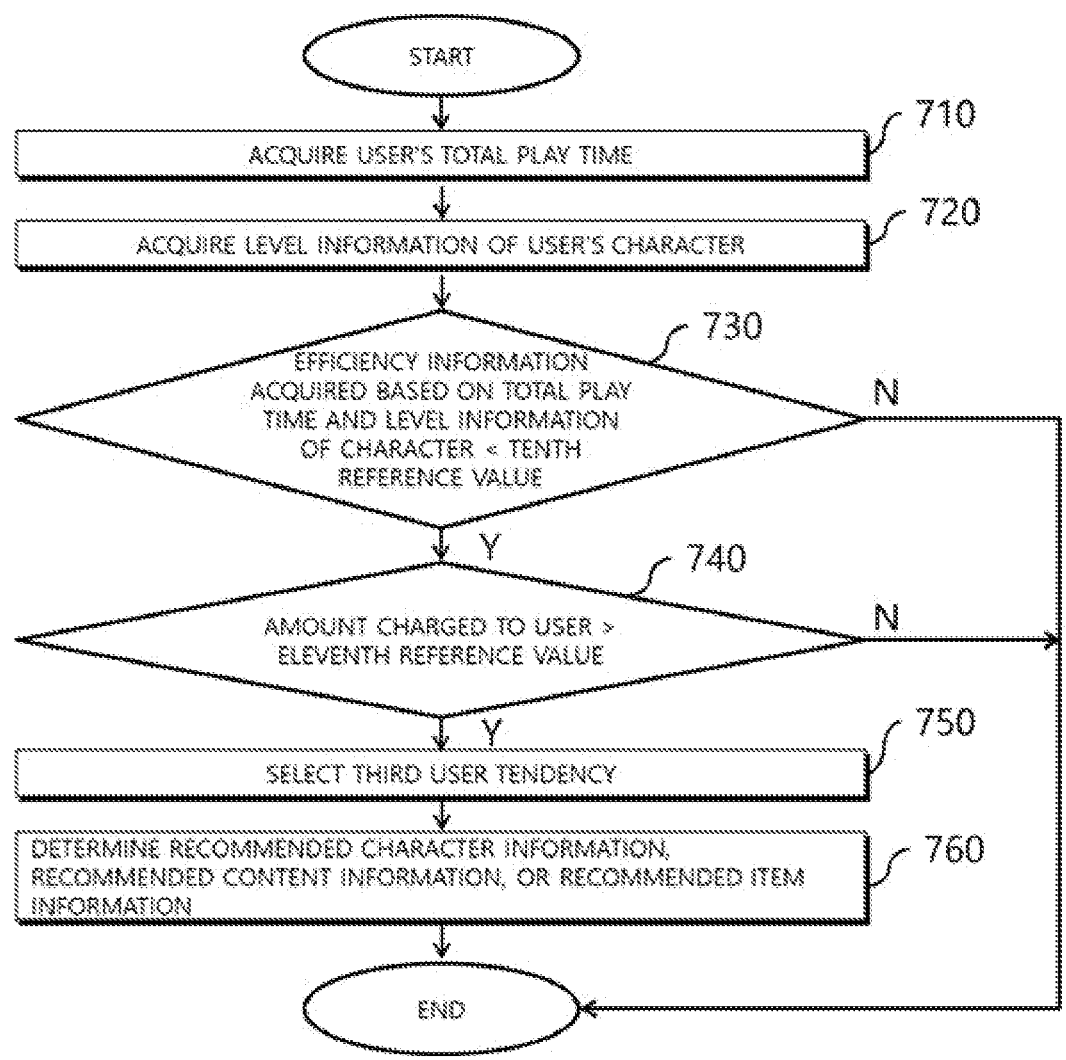
FIG. 7 is a flowchart showing a fifth model for providing game content information or game item information using a user's psychology according to an embodiment of the present disclosure.

FIG. 7 is a flowchart showing a fifth model for providing game content information or game item information using a user's psychology according to an embodiment of the present disclosure.

FIG. 7 is a flowchart for specifically describing FIG. 2 according to the fifth model. The fifth model is a psychological model aimed at users who are disappointed because of high expectations due to payment among users who have paid the charged amount. A user who pays the charged amount but doesn't get a corresponding result may easily quit the game. The server 100 according to the present disclosure may prevent the user from quitting the game by giving the user an additional reward on the basis of the fifth model.

The server 100 may perform an operation of acquiring the user's total play time from the play information (S710) in order to perform the operation of selecting the user's tendency information (220), which is shown in FIG. 2. Also, the server 100 may perform an operation of acquiring character level information of the user from the character information (720). The server 100 may perform an operation of determining whether efficiency information acquired on the basis of the total play time and the character level information is lower than a tenth reference value (730).

The efficiency information may be information related to the character level information based on the total play time. That is, the efficiency information may have a value proportional to the character level information based on the total play time.

The tenth reference value may refer to a threshold value used to determine a user's tendency. The tenth reference value may be a predetermined value. That is, the server 100 may use the tenth reference value prestored in the memory. However, the present disclosure is not limited thereto. The server 100 may determine the tenth reference value on the basis of a variety of information stored in the database. The server 100 may determine the tenth reference value differently depending on the user and over time. For example, the server 100 may determine, as the tenth reference value, the average of the character level information based on play times of other users.

When the efficiency information is lower than the tenth reference value, the server 100 may perform an operation of determining whether information related to the amount charged to the user, which is acquired from the billing information, is higher than an eleventh reference value (740).

The eleventh reference value may refer to a threshold value used to determine a user's tendency. The eleventh reference value may be a predetermined value. That is, the server 100 may use the eleventh reference value prestored in the memory. However, the present disclosure is not limited thereto. The server 100 may determine the eleventh reference value on the basis of a variety of information stored in the database. The server 100 may determine the eleventh reference value differently depending on the user and over time. For example, the server 100 may determine, as the eleventh reference value, the average of the charged amounts of other users.

When the information related to the amount charged to the user is higher than the eleventh reference value, the server 100 may perform an operation of selecting a third user tendency indicating an individualistic and extroverted tendency (750). When the third user tendency is selected as the user's tendency information, the server 100 may control the user terminal to display a message related to the user's tendency or a message related to the corresponding model.

The server 100 may perform the operation of determining the recommended character information, recommended content information, or recommended item information (230), which is shown in FIG. 2, according to the fifth model. When the third user tendency is selected as the user's tendency information, the server 100 may perform an operation of determining identification information of a discount voucher for purchasing at least one item with less online money than a market price as the recommended item information and determining, as the recommended content information, identification information of content for which an additional reward is set (760).

The user terminal may receive the identification information of the discount voucher or the identification information of content for which an additional reward is set through the game service provider server 130. The additional reward may be online money or an item that can be used by the user in the game. Also, the user may use the discount voucher or the content for which an additional reward is set, and the server 100 may prevent the user from quitting the game.

Figure 8:
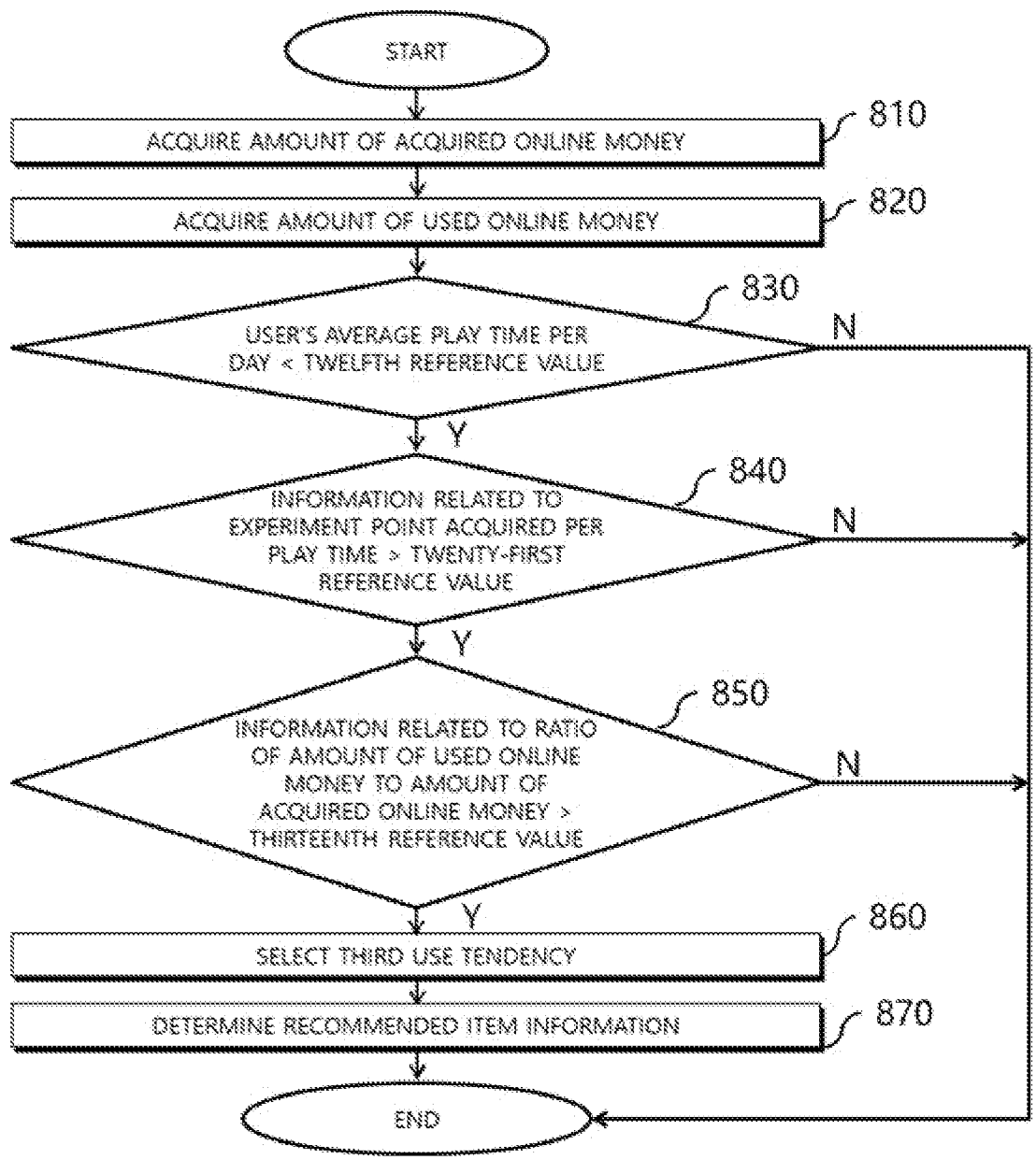
FIG. 8 is a flowchart showing a sixth model for providing game content information or game item information using a user's psychology according to an embodiment of the present disclosure.

FIG. 8 is a flowchart showing a sixth model for providing game content information or game item information using a user's psychology according to an embodiment of the present disclosure.

FIG. 8 is a flowchart for specifically describing FIG. 2 according to the sixth model. The sixth model is a psychological model aimed at users with a high online-money turnover rate of online money compared to a short gameplay time. When a result corresponding to a high online-money turnover rate is not obtained, the user may quit the game or purchase online money. The server 100 may increase the satisfaction of the user by providing the user with online money rather than an item or with a facilitating item that can allow quick collection of online money.

The server 100 may perform an operation of acquiring the amount of acquired online money from online-money acquisition information (810) in order to perform the operation of selecting the user's tendency information (220), which is shown in FIG. 2. Also, the server 100 may perform an operation of acquiring the amount of used online money from online money usage information (820).

The server 100 may perform an operation of determining whether information related to the user's average play time per day, which is acquired from the play information, is lower than a twelfth reference value (830).

The twelfth reference value may refer to a threshold value used to determine a user's tendency. The twelfth reference value may be a predetermined value. That is, the server 100 may use the twelfth reference value prestored in the memory. However, the present disclosure is not limited thereto. The server 100 may determine the twelfth reference value on the basis of a variety of information stored in the database. The server 100 may determine the twelfth reference value differently depending on the user and over time. For example, the server 100 may determine, as the twelfth reference value, the average of the average play times per day of other users.

When the information related to the user's average play time per day is lower than the twelfth reference value, the server 100 may perform an operation of determining whether information related to experience points acquired for the user's play time, which is acquired from the play information, is greater than a twenty-first reference value (840).

The twenty-first reference value may refer to a threshold value used to determine a user's tendency. The twenty-first reference value may be a predetermined value. That is, the server 100 may use the twenty-first reference value prestored in the memory. However, the present disclosure is not limited thereto. The server 100 may determine the twenty-first reference value on the basis of a variety of information stored in the database. The server 100 may determine the twenty-first reference value differently depending on the user and over time. For example, the server 100 may determine, as the twenty-first reference value, the average of experience points acquired according to play time of other users.

When the information related to experience points acquired according to the user's play time is greater than the twenty-first reference value, the server 100 may perform an operation of determining whether information related to the ratio of the amount of used online money to the amount of acquired online money is greater than a thirteenth reference value (850). The information related to the ratio may have a value proportional to the ratio.

The thirteenth reference value may refer to a threshold value used to determine a user's tendency. The thirteenth reference value may be a predetermined value. That is, the server 100 may use the thirteenth reference value prestored in the memory. However, the present disclosure is not limited thereto. The server 100 may determine the thirteenth reference value on the basis of a variety of information stored in the database. The server 100 may determine the thirteenth reference value differently depending on the user and over time. For example, the server 100 may determine, as the thirteenth reference value, the average of the ratios of the amount of used online money to the amount of acquired online money of other users.

When the information related to the ratio of the amount of used online money to the amount of acquired online money is higher than the thirteenth reference value, the server 100 may perform an operation of selecting a third user tendency indicating an individualistic and extroverted tendency (860). When the third user tendency is selected as the user's tendency information, the server 100 may control the user terminal to display a message related to the user's tendency or a message related to the corresponding model.

The server 100 may perform the operation of determining the recommended character information, recommended content information, or recommended item information (230), which is shown in FIG. 2, according to the sixth model. When the third user tendency is selected as the user's tendency information, the server 100 may perform an operation of determining identification information of an item for increasing an online money acquisition rate as the recommended item information (870). The user terminal may receive the identification information of the item for increasing the online money acquisition rate through the game service provider server 130. Users can quickly collect online money by using the item for increasing the online money acquisition rate.

Figure 9:
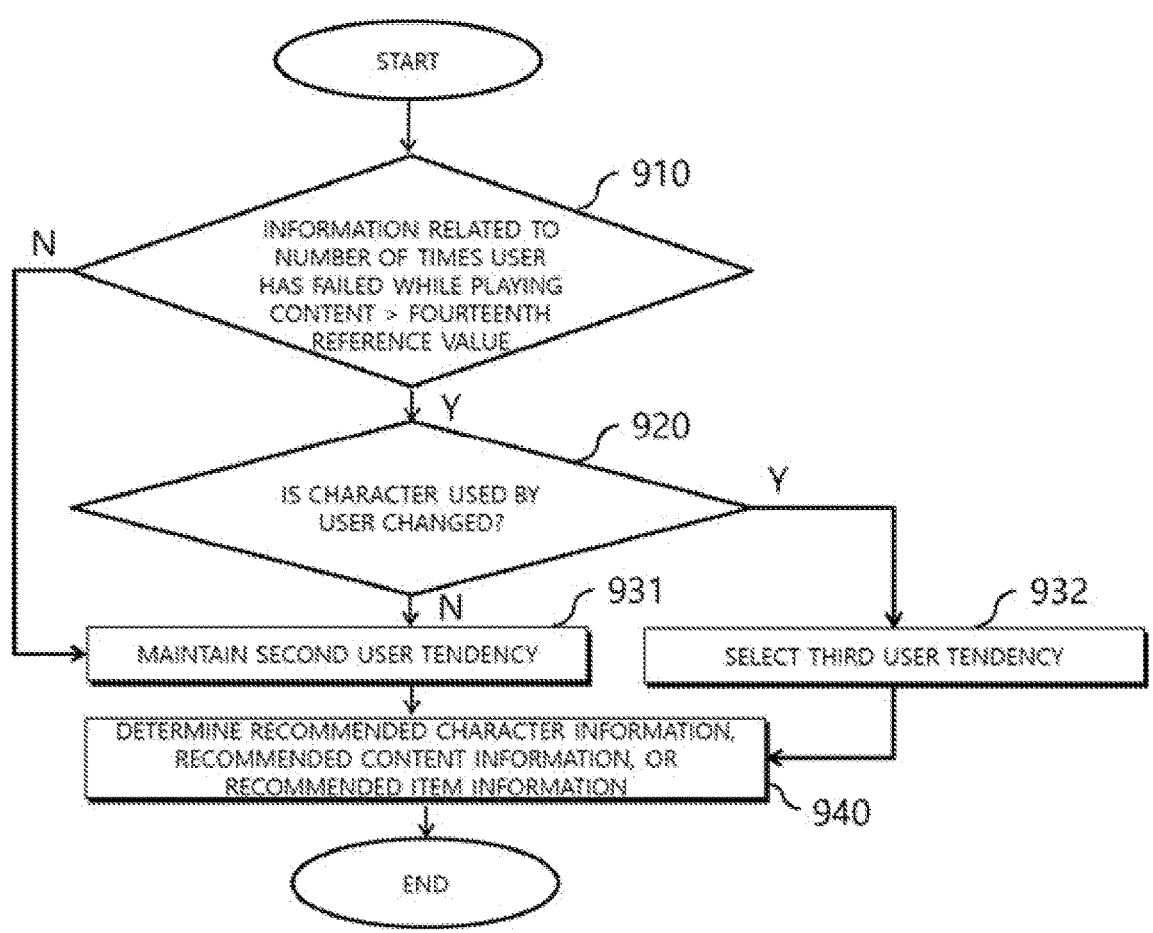
FIG. 9 is a flowchart showing a seventh model for providing game content information or game item information using a user's psychology according to an embodiment of the present disclosure.

FIG. 9 is a flowchart showing a seventh model for providing game content information or game item information using a user's psychology according to an embodiment of the present disclosure.

FIG. 9 is a flowchart for specifically describing FIG. 2 according to the seventh model. The seventh model is a psychological model aimed at users who like a specific character due to an individualistic and introverted factor, collect related items, and play the character. The users are so interested in the corresponding character that they may be less likely to quit the game and may try to develop the character. Based on the seventh model, the server 100 may assign a challengeable task through a related character or provide a special effect applicable to the character.

The server 100 may perform an operation of determining whether information related to the number of times the user has failed while playing content, which is acquired from the play information, is higher than a fourteenth reference value (910) when the second user tendency is pre-selected in order to perform the operation of selecting the user's tendency information (220) which is shown in FIG. 2.

The fourteenth reference value may refer to a threshold value used to determine a user's tendency. The fourteenth reference value may be a predetermined value. That is, the server 100 may use the fourteenth reference value prestored in the memory. However, the present disclosure is not limited thereto. The server 100 may determine the fourteenth reference value on the basis of a variety of information stored in the database. The server 100 may determine the fourteenth reference value differently depending on the user and over time. For example, the server 100 may determine, as the fourteenth reference value, the average of the numbers of times other users have failed while playing the content.

When the information related to the number of times the user has failed while playing the content is higher than the fourteenth reference value, the server 100 may perform an operation of determining whether a character used by the user is changed (920). The server 100 may check character identification information of the user among pieces of data recorded in the database after the information related to the number of times the user has failed while playing the content exceeds the fourteenth reference value. The server 100 may determine whether the user has changed a character in use on the basis of whether the identification information of the character being used by the user is changed. That is, the server may determine whether the user does not change a character even though the information related to the number of times the user has failed while playing the content exceeds the fourteenth reference value. When the user does not change a character, the server 100 may determine that the user has high attachment to the character.

When the character being used by the user is not changed, the server 100 may perform an operation of maintaining the user's tendency information at the second user tendency (931). Also, when the character being used by the user is changed, the server 100 may perform an operation of changing the user's tendency information from the second user tendency to the third user tendency indicating an individualistic and extroverted tendency (932). When the user's tendency information is changed to the third user tendency, the server 100 may control the user terminal to display a message related to the user's tendency.

That is, according to the seventh model shown in FIG. 9, the server 100 may maintain the user's tendency at the second user tendency or may change the user's tendency to the third user tendency. The server 100 may perform an operation of determining the recommended character information, recommended content information, or recommended item information according to the seventh model (940).

The server 100 may perform the operation of determining the recommended character information, recommended content information, or recommended item information (230), which is shown in FIG. 2, according to the sixth model. When the user's tendency information is maintained at the second user tendency, the server 100 may perform an operation of determining, as the recommended content information or the recommended item information, identification information of content or an item related to one of a plurality of characters owned by the user.

The server 100 may classify the user as the second user tendency and determine that the user is attached to a small number of characters among the plurality of characters owned by the user. The server 100 may determine whether the user has not changed the character in use in operation 920. In this case, the server 100 may determine the character that is not changed by the user as a character to which the user is attached. The server 100 may determine an item or content that can be used for an unchanged character as the recommended item or recommended content. Users can immerse themselves in the game by enjoying content or using items while using characters to which they are attached.

When the server 100 changes the user's tendency information to the third user tendency, the server 100 may perform an operation of determining identification information of a character, content, or an item related to the plurality of characters owned by the user as the recommended character information, recommended content information, or recommended item information.

The server 100 may classify the user as the third user tendency and determine that the user is attached to the plurality of characters owned by the user. The server 100 may determine the identification information of the character, content, or item related to the plurality of characters owned by the user as the recommended character information, recommended content information, or recommended item information.

Figure 10:
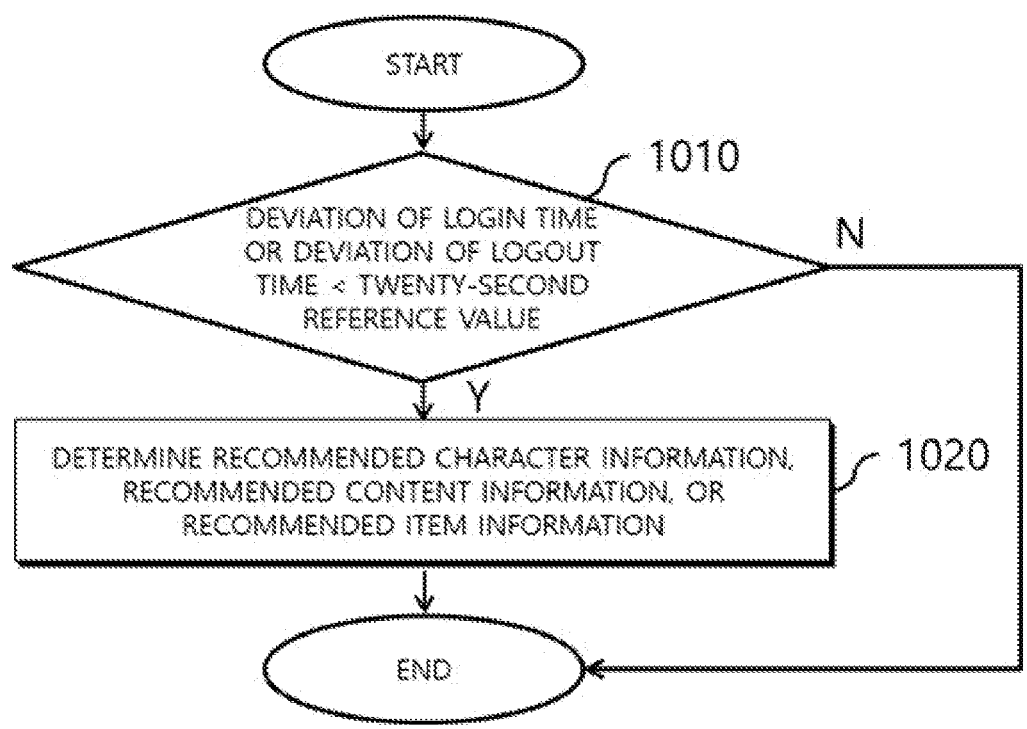
FIG. 10 is a flowchart showing an eighth model for providing game content information or game item information using a user's psychology according to an embodiment of the present disclosure.

The character related to the plurality of characters owned by the user may be a character that is included in the same category as the plurality of characters held by the user. For example, when the plurality of characters owned by the user are in an "offense" category, the related character may also be an "offense" character. Alternatively, the character related to the plurality of characters owned by the user may be a character capable of forming a team with the plurality of characters owned by the user. For example, when the plurality of characters form a combination, each character may have enhanced ability points. In this case, the related character may be a character with an enhanced ability point when forming a combination with a character owned by the user. Also, the server 100 may determine identification information of content or an item available to the plurality of characters as the recommended content information or recommended item information. FIG. 10 is a flowchart showing an eighth model for providing game content information or game item information using a user's psychology according to an embodiment of the present disclosure.

FIG. 10 is a flowchart for specifically describing FIG. 2 according to the eighth model. The eighth model is aimed at users who play only in a specific time period such as while commuting or on weekdays. The server 100 may analyze time-series data of the user's play and find out his or her favorite time to play. The server 100 may provide an item that is available only in a time period during which the user plays frequently so that the user plays the game regularly on the basis of the eighth model.

The server 100 may perform an operation of determining whether a deviation of the user's login time during a predetermined time of period or a deviation of the user's logout time during a predetermined time of period, which is acquired from the login information, is lower than a twenty-second reference value (1010) in order to perform the operation of selecting the user's tendency information 220 which is shown in FIG. 2.

The predetermined period of time refers to a period from a recent time point to a predetermined past time point, and the server 100 may use data stored during the predetermined period of time. For example, the predetermined period of time may be a previous week, a previous month, or a previous year.

The login time or the logout time may be expressed numerically. The deviation is a number that represents the difference between a value of the data and the average of the data. The server 100 may compute the difference between the login time and the average login time and the difference between the logout time and the average logout time. The server 100 may compute the deviation using variance and standard deviation.

When the deviation of the user's login time during the predetermined period of time or the deviation of the user's logout time during the predetermined period of time is lower than a twenty-second reference value, the server 100 may determine that the user primarily plays the game in a specific time period.

The twenty-second reference value may be information for determining whether the user primarily plays the game in a specific time period. The twenty-second reference value may be a predetermined value. That is, the server 100 may use the twenty-second reference value prestored in the memory. However, the present disclosure is not limited thereto. The server 100 may determine the twenty-second reference value on the basis of a variety of information stored in the database. The server 100 may determine the twenty-second reference value differently depending on the user and over time. For example, the server 100 may determine, as the twenty-second reference value, the average of the deviations of the login times or the logout times of other users during the predetermined period of time.

The server 100 may determine recommended character information, recommended item information, or recommended content information for the user according to the eighth model. When the deviation of the login time of the user during the predetermined period of time or the deviation of the logout time of the user during the predetermined period of time, which is acquired from the login information, is lower than the twenty-second reference value, the server 100 may perform an operation of determining identification information of a character, content, and an item available only within the period from the login time to the logout time as the recommended character information, recommended content information, or recommended item information (1020).

The server 100 may determine a time duration during which the user plays the game using information related to the user's login time or information related to the user's logout time. The server 100 may determine identification information of a character, content, or an item available only in a specific time duration range including the time duration during which the user plays the game as the recommended character information, recommended content information, or recommended item information. The user terminal may receive the recommended character information, the recommended content information, or the recommended item information through the game service provider server 130. The server 100 may provide a user with a recommended character, content, or item to increase the user's loyalty to the game.

Figure 11:
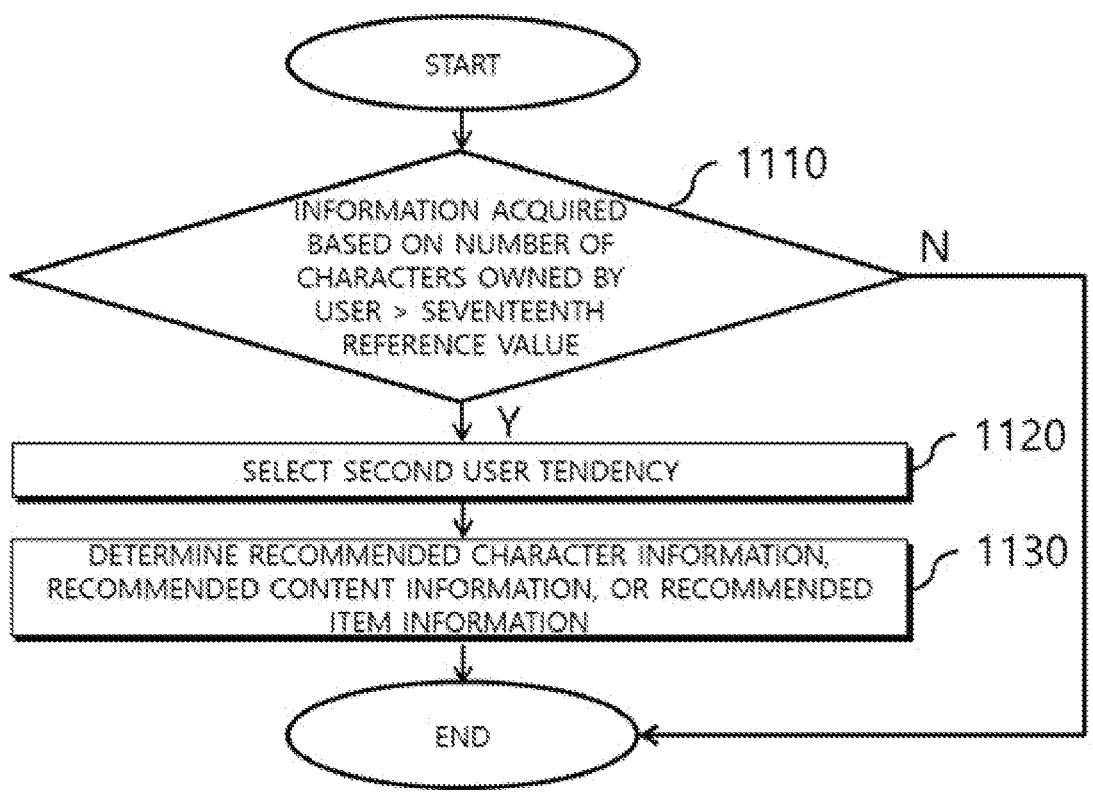
FIG. 11 is a flowchart showing a ninth model for providing game content information or game item information using a user's psychology according to an embodiment of the present disclosure.

FIG. 11 is a flowchart showing a ninth model for providing game content information or game item information using a user's psychology according to an embodiment of the present disclosure.

FIG. 11 is a flowchart for specifically describing FIG. 2 according to the ninth model. The ninth model is a model for character users who collect various character types and various materials of the characters. The users have an individualistic and introverted tendency in that they collect characters regardless of gameplay. The server 100 may suggest content for the user depending on whether a character's level is high or low.

The server 100 may perform an operation of determining whether information acquired based on the number of characters owned by the user, which is acquired from the character information, is higher than a seventeenth reference value (1110) in order to perform the operation of selecting the user's tendency information (220) which is shown in FIG. 2.

The server 100 may determine the information acquired based on the number of characters owned by the user through the following process. The server 100 may acquire information (a) related to the number of characters owned by the user from the database. Also, the server 100 may determine whether the user owns an item available only to a specific character. Also, the server 100 may acquire information (b) related to the number of characters to which an item available only to specific characters among the characters owned by the user can be applied. Also, the server 100 may acquire the average (c) of the level of each character. In this case, an index (d) may be determined using Equation 1.

$$d=\log(a)*w1+\log(b)*w2+c*w3 \qquad \text{[Equation 1]}$$

Here, w1, w2, and w3 may be predetermined weights. The weights may have a relationship of w2>w1>w3.

Also, the server 100 may set the maximum score of information (e) acquired based on the number of characters owned by the user as "A." "A" may be a predetermined value. The server 100 may compute "d" for all users. Also, the server 100 may determine the maximum value of "d" of all the users as max_d. The server 100 may determine the information (e) acquired based on the number of characters owned by the user using Equation 2.

$$e=d*A/\text{max\_}d \qquad \text{[Equation 2]}$$

The seventeenth reference value may refer to a threshold value used to determine a user's tendency. The seventeenth reference value may be a predetermined value. That is, the server 100 may use the seventeenth reference value prestored in the memory. However, the present disclosure is not limited thereto. The server 100 may determine the seventeenth reference value on the basis of a variety of information stored in the database. The server 100 may determine the seventeenth reference value differently depending on the user and over time. For example, the server 100 may determine, as the seventeenth reference value, the average of information (e') acquired based on the numbers of characters owned by other users.

When the information (e) acquired based on the number of characters owned by the user is higher than the seventeenth reference value, the server 100 may perform an operation of selecting the second user tendency indicating an individualistic and introverted tendency (1120). When the second user tendency is selected as the user's tendency information, the server 100 may control the user terminal to display a message related to the user's tendency or a message related to the corresponding model.

Also, the server 100 may perform an operation of determining recommended character information, recommended item information, or recommended content information for the user according to the ninth model (1130). For example, the server 100 may perform an operation of determining identification information of at least one piece of content as the recommended content information. The server 100 may determine identification information of at least one piece of content on the basis of the level of the user's character. The identification information of at least one piece of content may be predetermined according to the level of the character.

The server 100 may determine the recommended item information for users who are to be analyzed and who have a gameplay time shorter than a threshold time in the following manner. The server 100 may compute a score corresponding to Equation 2 on the basis of information of all users included in the database. The server 100 may perform the computation using data collected in the database during a predetermined period of time. The server 100 may sort the users depending on the score and determine users included in the top-ranking group. The top-ranking group may refer to a group of users within the top x percent. The server 100 may acquire identification information of characters that are primarily used by the users included in the top-ranking group during a predetermined period of time. The primarily used characters may refer to characters used for the longest time or characters used the most number of times among characters owned by the users.

The server 100 may determine identification information of the character that is primarily used by the users included in the top-ranking group as recommended character information for the user to be analyzed. The server 100 may determine identification information of an item capable of acquiring a character that is primarily used by the users included in the top-ranking group as recommended item information for the user to be analyzed. Also, the server 100 may determine identification information of an item capable of enhancing the ability point of a character that is primarily used by the users included in the top-ranking group as recommended item information for the user to be analyzed.

The user may use the recommended character and the recommended item on the basis of the recommended character information and recommended item information determined by the server 100. The server 100 may allow the user to enjoy the game for a long time on the basis of the recommended character and the recommended item provided to the user.

The server 100 may determine whether the characters that are primarily used by the users included in the top-ranking group are owned by the user to be analyzed. When the user to be analyzed owns the corresponding character, the server 100 may compare information related to the level of the corresponding character owned by the user to be analyzed and the average of information related to the levels of the character that is primarily used by the users included in the top-ranking group. The server 100 may provide the user with an increased number of items capable of enhancing the ability point of the corresponding character as the information related to the level of the corresponding character owned by the user to be analyzed becomes lower than the average of the information related to the levels of the character that is primarily used by the users included in the top-ranking group.

The server 100 may determine the recommended item information for users who are to be analyzed and who have a gameplay time longer than a threshold time in the following manner. The server 100 may compute a score corresponding to Equation 2 on the basis of information of all users included in the database. The server 100 may perform the computation using data collected in the database during a predetermined period of time. The server 100 may sort the users depending on the score and determine users included in the top-ranking group. The top-ranking group may refer to a group of users within the top x percent. The server 100 may acquire identification information of characters that are being primarily used by the users included in the top-ranking group during a predetermined period of time. The primarily used characters may refer to characters used for the longest time or characters used the most number of times among characters owned by the users. Each of a plurality of users included in the top-ranking group may have a plurality of characters which are primarily used. The server 100 may acquire identification information of the plurality of characters that are primarily used by the plurality of users included in the top-ranking group.

The server 100 may determine whether the characters that are primarily used by the users included in the top-ranking group are owned by the user to be analyzed. When the user to be analyzed owns the corresponding character, the server 100 may compare information related to the level of the corresponding character owned by the user to be analyzed and the average of the levels of the character that is primarily used by the users included in the top-ranking group. The server 100 may recommend an item for enhancing the ability point of the corresponding character to the user to be analyzed when the information related to the level of the corresponding character owned by the user to be analyzed is lower than the average of the information related to the levels of the character that is primarily used by the users included in the top-ranking group. Also, when the probability of acquiring the character is lower than a threshold probability, the server 100 may determine the identification information of the corresponding character as the recommended character information.

The server 100 may determine identification information of a plurality of characters as the recommended character information. The server 100 may determine identification information of an item capable of acquiring a plurality of characters or identification information of an item capable of enhancing the ability points of the plurality of characters as the recommended item information. The game service provider server 130 may transmit the recommended character information and the recommended item information to the user terminal. The user may select one of a plurality of pieces of recommended character information or a plurality of pieces of recommended item information. Since the server 100 recommends a character or an item on the basis of a user's tendency, it is possible to lower the probability of the user quitting the game service.

Figure 12:
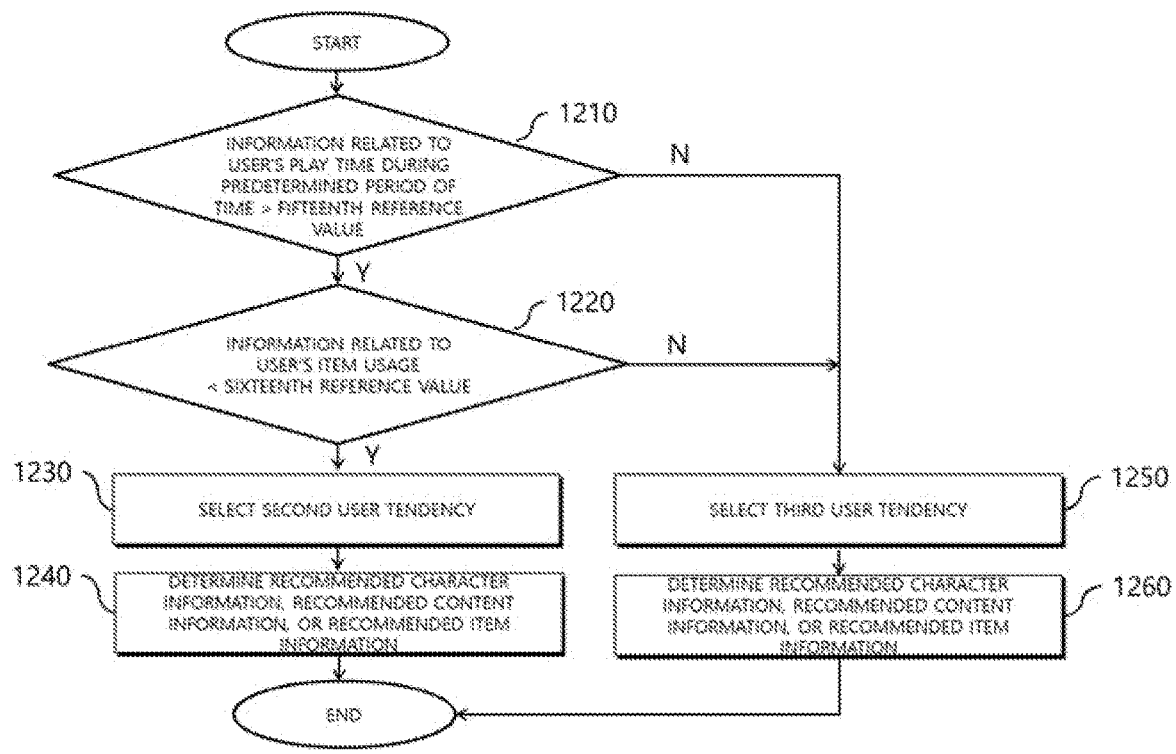
FIG. 12 is a flowchart showing a tenth model for providing game content information or game item information using a user's psychology according to an embodiment of the present disclosure.

FIG. 12 is a flowchart showing a tenth model for providing game content information or game item information using a user's psychology according to an embodiment of the present disclosure.

FIG. 12 is a flowchart for specifically describing FIG. 2 according to the tenth model. The tenth model is aimed at users who frequently play a game in an early stage after signing up for a game service but have low effectiveness compared to the time invested for the game.

The server 100 may perform an operation of determining whether information related to the user's play time during a predetermined period of time, which is acquired from the play information, is higher than a fifteenth reference value (1210). Here, the predetermined period of time refers to a certain period of time having passed since the user signed up for the game service. The predetermined period of time may include one week, four weeks, one month, and the like.

The fifteenth reference value may refer to a threshold value used to determine a user's tendency. The fifteenth reference value may be a predetermined value. That is, the server 100 may use the fifteenth reference value prestored in the memory. However, the present disclosure is not limited thereto. The server 100 may determine the fifteenth reference value on the basis of a variety of information stored in the database. The server 100 may determine the fifteenth reference value differently depending on the user and over time. For example, the server 100 may determine, as the fifteenth reference value, the average of play times of other users during the predetermined time of period.

The server 100 may perform an operation of determining whether information related to the user's item usage, which is acquired from the item usage information, is lower than a sixteenth reference value (1220).

The information related to the user's item usage may be information related to the number of specific items used by the user. For example, the server 100 may acquire the amount of consumption of an item that increases the level of the user's character and then disappears from the item usage information. However, the present disclosure is not limited thereto, and the information related to the user's item usage may refer to the total number of items used by the user.

The sixteenth reference value may refer to a threshold value used to determine a user's tendency. The sixteenth reference value may be a predetermined value. That is, the server 100 may use the sixteenth reference value prestored in the memory. However, the present disclosure is not limited thereto. The server 100 may determine the sixteenth reference value on the basis of a variety of information stored in the database. The server 100 may determine the sixteenth reference value differently depending on the user and over time. For example, the server 100 may determine, as the sixteenth reference value, the average of other users' item usage.

The server 100 may determine the sixteenth reference value differently depending on the type of the item used by the user. For example, as described above, when the server 100 acquires the amount of consumption of an item that increases the level of the user's character and then disappears from the item usage information, the server 100 may determine the sixteenth reference value corresponding to the amount of consumption of the item that increases the level of the user's character and then disappears.

When the information related to the user's play time during the predetermined period of time is higher than the fifteenth reference value and the information related to the user's item usage is lower than the sixteenth reference value, the server 100 may perform an operation of selecting the second user tendency indicating an individualistic and introverted tendency (1230). When the second user tendency is selected as the user's tendency information, the server 100 may control the user terminal to display a message related to the user's tendency or a message related to the corresponding model.

When the information related to the user's play time during the predetermined period of time is lower than the fifteenth reference value and the information related to the user's item usage is higher than the sixteenth reference value, the server 100 may perform an operation of selecting the third user tendency indicating an individualistic and extroverted tendency (1250). When the third user tendency is selected as the user's tendency information, the server 100 may control the user terminal to display a message related to the user's tendency or a message related to the corresponding model.

The server 100 may perform the operation of determining the recommended character information, recommended content information, or recommended item information (230), which is shown in FIG. 2, according to the tenth model. When the second user tendency is selected as the user's tendency information, the server 100 may perform an operation of determining identification information of content for providing the user with at least one character or item as the recommended content information (1240). The at least one item may be an item that develops the user's character. For example, when the user uses the at least one item, the level or experience points of the user's character may be increased.

When the third user tendency is selected as the user's tendency information, the server 100 may perform an operation of determining identification information of at least one character, at least one item, or at least one piece of content provided to the user as the recommended character information, recommended item information, or recommended content information (1260).

Figure 13:
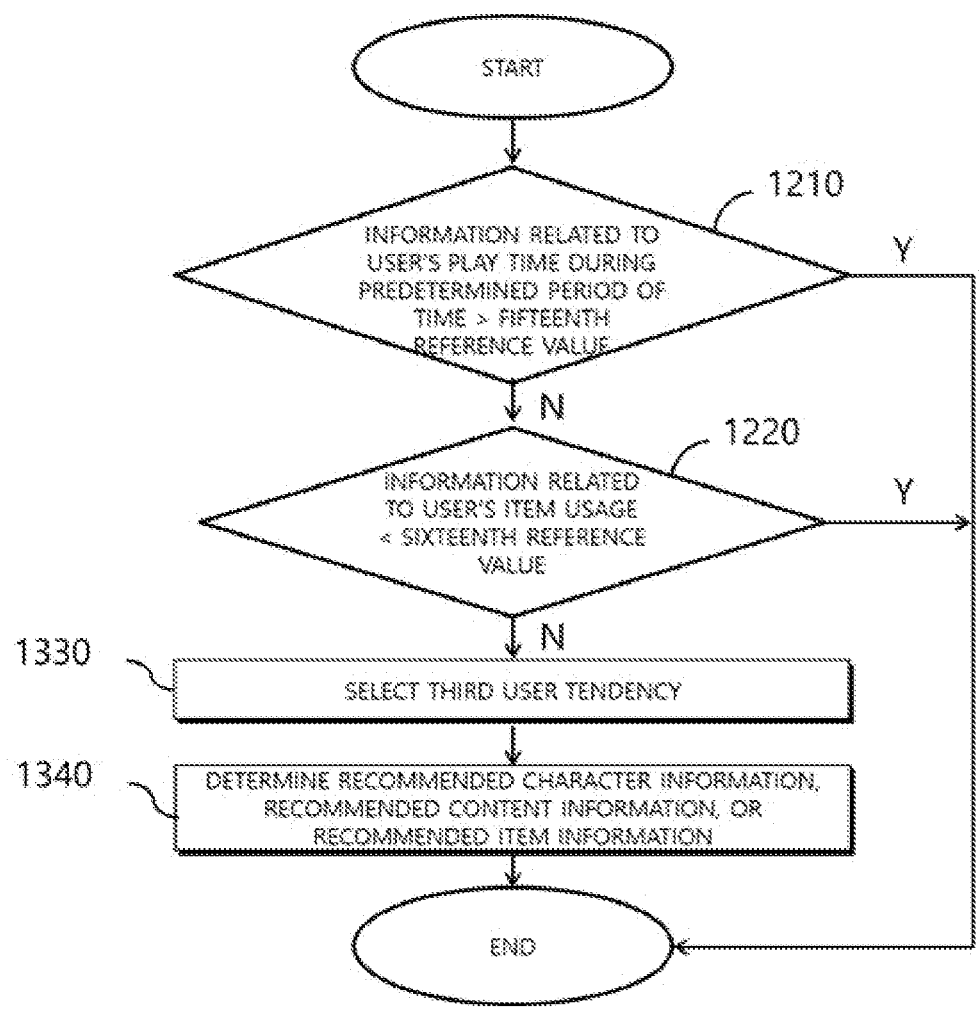
FIG. 13 is a flowchart showing an eleventh model for providing game content information or game item information using a user's psychology according to an embodiment of the present disclosure.

FIG. 13 is a flowchart showing an eleventh model for providing game content information or game item information using a user's psychology according to an embodiment of the present disclosure.

FIG. 13 is a flowchart for specifically describing FIG. 2 according to the eleventh model. The eleventh model is for analyzing users who develop their characters by progressing through a game quickly after signing up for a game service. A corresponding user develops a character quickly and decides whether to continue playing the game. When the character's development progresses slowly, the corresponding user may quit the game because his or her individualistic and extroverted tendency is not satisfied. The server 100 may inform the user that he or she is progressing through the game relatively quickly compared to other users and recommend related items to induce him or her to play the game for a long time.

The server 100 may perform the operation of determining whether information related to the user's play time during a predetermined period of time, which is acquired from the play information, is higher than the fifteenth reference value (1210). Here, the predetermined period of time refers to a certain period of time having passed since the user signed up for the game service. The predetermined period of time may include one week, four weeks, one month, and the like.

The server 100 may perform the operation of determining whether information related to the item usage of the user, which is acquired from the item usage information, is lower than the sixteenth reference value (1220).

The information related to the user's item usage may be information related to the number of specific items used by the user. For example, the server 100 may acquire the amount of consumption of an item equipped by the user's character to increase the level of the user's character from the item usage information. The ability of the user's character may include attack power, a critical strike rate, defense power, an evasion rate, vitality, an attack speed, a movement speed, or a skill cooling time. However, the present disclosure is not limited thereto, and the information related to the user's item usage may refer to the total number of items used by the user.

The server 100 may determine the sixteenth reference value differently depending on the type of the item used by the user. For example, as described above, when the server 100 acquires the amount of consumption of the item equipped by the user's character to increase the ability of the user's character from the item usage information, the server 100 may determine the sixteenth reference value corresponding to the amount of consumption of the item equipped by the user's character to increase the ability of the user's character.

Referring to FIGS. 12 and 13, the tenth model and the eleventh model may use pieces of information on the usage of different items. Also, the tenth model and the eleventh model may use different sixteenth reference values.

When the information related to the user's play time during the predetermined period of time is lower than the fifteenth reference value and the information related to the user's item usage is higher than the sixteenth reference value, the server 100 may perform an operation of selecting the third user tendency indicating an individualistic and extroverted tendency (1330). When the third user tendency is selected as the user's tendency information, the server 100 may control the user terminal to display a message related to the user's tendency or a message related to the corresponding model.

The server 100 may perform the operation of determining the recommended character information, recommended content information, or recommended item information (230), which is shown in FIG. 2, according to the eleventh model. When the third user tendency is selected as the user's tendency information, the server 100 may perform an operation of determining identification information of at least one character or at least one item as the recommended character information or recommended item information (1340).

The server 100 may determine the identification information of the at least one character or the at least one item as the recommended character information or recommended item information. The at least one item may be any item. For example, the at least one item may be an item that develops the user's character. In detail, when the user uses the at least one item, the level or experience points of the user's character may be increased.

Figure 14:
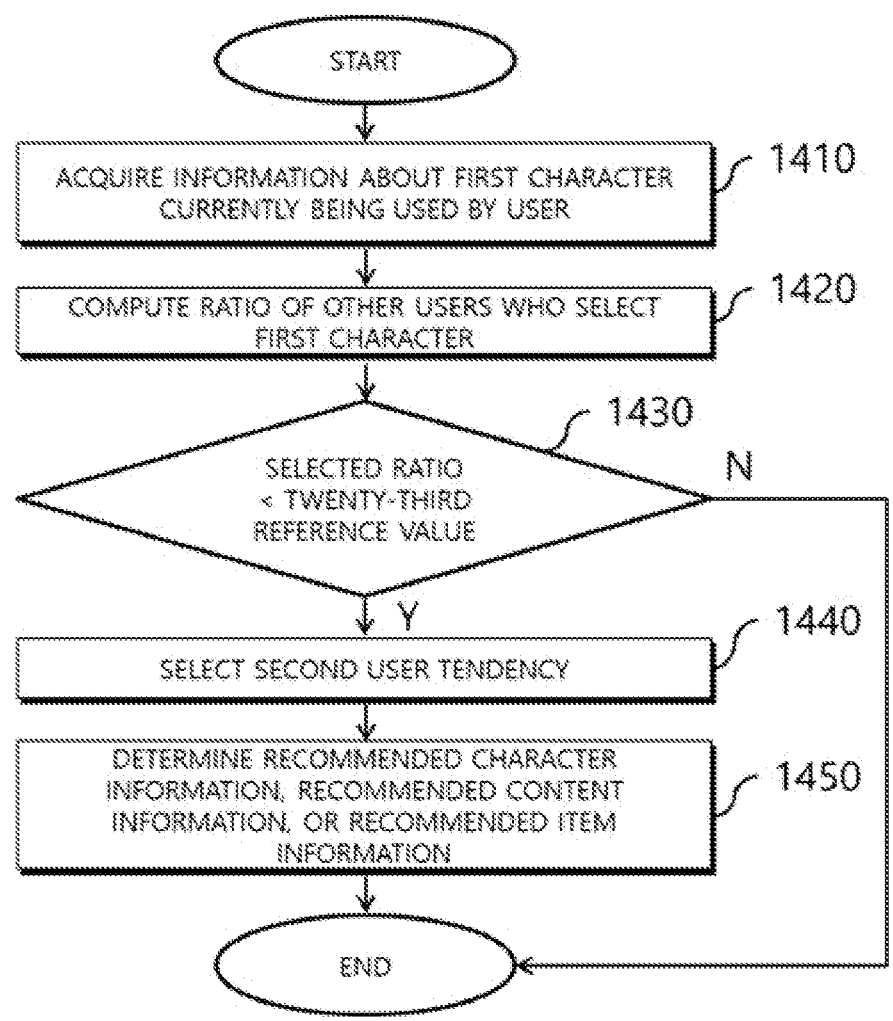
FIG. 14 is a flowchart showing a twelfth model for providing game content information or game item information using a user's psychology according to an embodiment of the present disclosure.

FIG. 14 is a flowchart showing a twelfth model for providing game content information or game item information using a user's psychology according to an embodiment of the present disclosure.

FIG. 14 is a flowchart for specifically describing FIG. 2 according to the twelfth model. The twelfth model is aimed at users who feel gameplay is difficult but rewarding due to leveling up a character with relatively low competitiveness at the beginning of signing up for a game service. In reality, since it is difficult to play the game, the server 100 may provide a factor that can help in leveling up the character so as to lower the user's quit rate and may provide the user with data on users who successfully leveled up the character.

The server 100 may perform an operation of acquiring information related to a first character that is currently being used by the user from the character information (1410) in order to perform the operation of selecting the user's tendency information (220) which is shown in FIG. 2. Also, the server 100 may perform an operation of computing the ratio of users who use the first character to all the users on the basis of the information regarding the first character (1420). In detail, the server 100 may acquire identification information of the first character that is currently being used by the user. The server 100 may determine users who play the first character in the database on the basis of the identification information of the first character. Also, the server 100 may compute the ratio of the users who use the first character to the total number of users.

The server 100 may perform an operation of determining whether the ratio in use is lower than a twenty-third reference value (1430). The twenty-third reference value may be a number for determining whether the first character is unpopular with users. The twenty-third reference value may be set to be low. The twenty-third reference value may be a predetermined value. That is, the server 100 may use the twenty-third reference value prestored in the memory. However, the present disclosure is not limited thereto. The server 100 may determine the twenty-third reference value depending on the user and over time on the basis of a variety of information stored in the database. The server 100 may determine the twenty-third reference value differently depending on the user and over time. For example, the server 100 may determine, as the twenty-third reference value, the average of the ratios of the number of users who use characters other than the first character to the total number of users.

When the ratio in use is lower than the twenty-third reference value, the server 100 may perform an operation of selecting the second user tendency indicating an individualistic and introverted tendency (1440). When the second user tendency is selected as the user's tendency information, the server 100 may control the user terminal to display a message related to the user's tendency or a message related to the corresponding model. The server 100 may determine that the first character is an unpopular character. Since the user uses an unpopular character, he or she may be classified as an individualistic and introverted tendency.

The server 100 may perform the operation of determining the recommended character information, recommended content information, or recommended item information (230), which is shown in FIG. 2, according to the twelfth model. When the second user tendency is selected as the user's tendency information, the server 100 may perform an operation of determining identification information of content or an item related to the first character as the recommended content information or the recommended item information (1450). The server 100 may store identification information of content available for each character and identification information of an item available for each character in the database in advance. The server 100 may acquire identification information of content corresponding to the first character and identification information of an item corresponding to the first character from the database. The server 100 may determine identification information of content available for the first character or identification information of an item available for the first character as the recommended content information or the recommended item information.

Since the user uses the first character, which is unpopular with users, the server 100 may determine that the user is attached to the first character. The server 100 may allow the user to decorate the character to which he or she is attached, increase the level of the character, or increase the experience points of the character on the basis of the recommended content information or the recommended item information.

Figure 15:
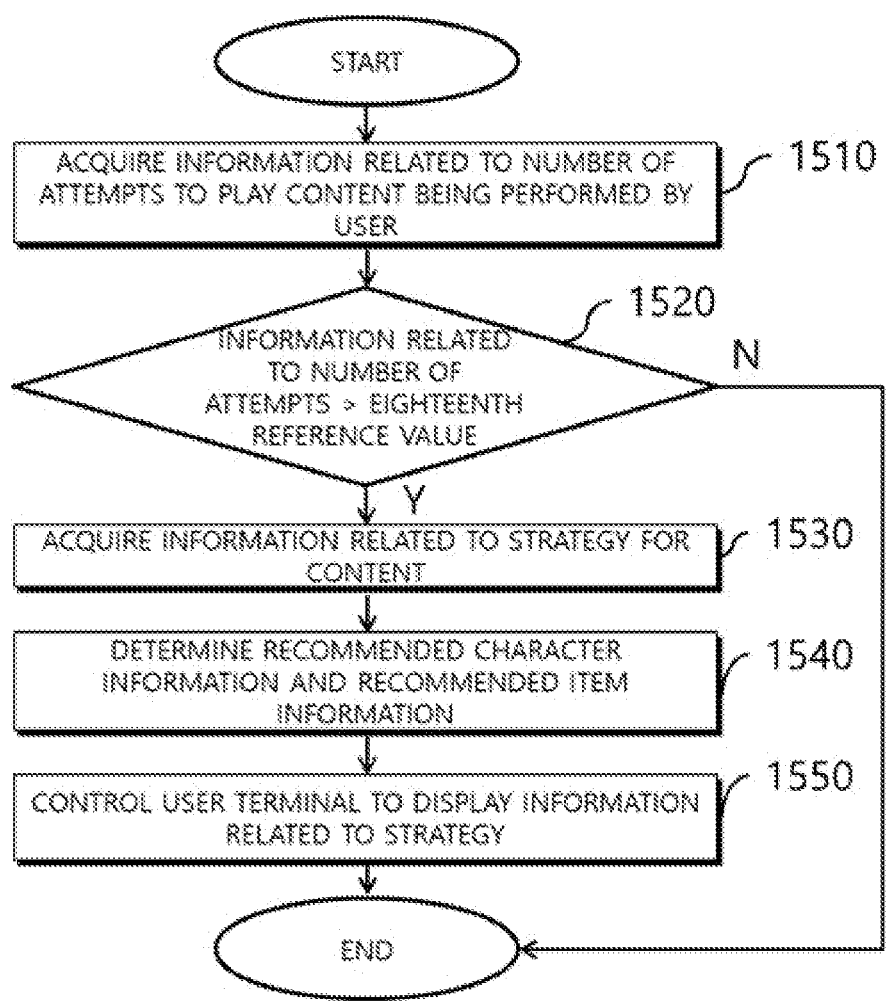
FIG. 15 is a flowchart showing a thirteenth model for providing game content information or game item information using a user's psychology according to an embodiment of the present disclosure.

FIG. 15 is a flowchart showing a thirteenth model for providing game content information or game item information using a user's psychology according to an embodiment of the present disclosure.

FIG. 15 is a flowchart for specifically describing FIG. 2 according to the thirteenth model. The thirteenth model is a psychological model aimed at users who perform quests with high difficulty at the beginning of a game. The users may have a high degree of understanding of the game and have already established a gameplay plan. Accordingly, when the game progress is blocked or not going as planned, the users may quit the game. In this case, the server 100 may prevent the user from quitting the game by helping the user understand the quests or by recommending related items.

The thirteenth model may be performed after the server 100 selects the second user tendency or the third user tendency as the user's tendency.

The server 100 may perform an operation of acquiring information related to the number of attempts to play content being performed by the user from the play information (1510) in order to perform the operation of selecting the user's tendency information (220), which is shown in FIG. 2. Among pieces of game service content, there may be content for which the final goal can be achieved only by repeating the same content. The user may or may not feel bored with the repetition depending on his or her tendency.

Also, the server 100 may perform an operation of determining whether the information related to the number of attempts is higher than an eighteenth reference value (1520). The eighteenth reference value may be a threshold value indicating the number of repetitions of content by which a user starts to feel bored. The eighteenth reference value may be a predetermined value. That is, the server 100 may use the eighteenth reference value prestored in the memory.

The server 100 may perform the operation of determining the recommended content information or recommended item information (230), which is shown in FIG. 2, according to the thirteen model. When the information related to the number of attempts is higher than the eighteenth reference value and the second user tendency or the third user tendency is selected as the user's tendency information, the server 100 may perform an operation of acquiring information related to a strategy for content (1530).

The server 100 may predetermine the second user tendency or the third user tendency as the user's tendency on the basis of other models.

The information related to the strategy for the content may be text. Alternatively, the information related to the strategy for the content may be identification information of an item that helps the user play the content. The server 100 may acquire information related to the strategy for the content on the basis of data prestored in the memory. Also, the server 100 may determine play information of other users as the information related to the strategy for the content. For example, the server 100 may determine item information used by other users as the information related to the strategy for the content.

The server 100 may determine an operation of determining identification information of at least one character or at least one item as the recommended character information or the recommended item information (1540). The server 100 may determine identification information of any item as the identification information of the at least one item. The server 100 may provide a user with any item to provide rewards for the repetitions. The user can feel less bored with the repetitions of the content by receiving the item.

The server 100 may perform an operation of controlling the user terminal to display the information related to the strategy for the content (1550). Operation 1550 may be included in operation 240 of FIG. 2. The server 100 may transmit the information related to the strategy to the game service provider server 130. The game service provider server 130 may transmit the information related to the strategy to the user terminal. The user terminal may display the information related to the strategy on a display unit.

Figure 16:
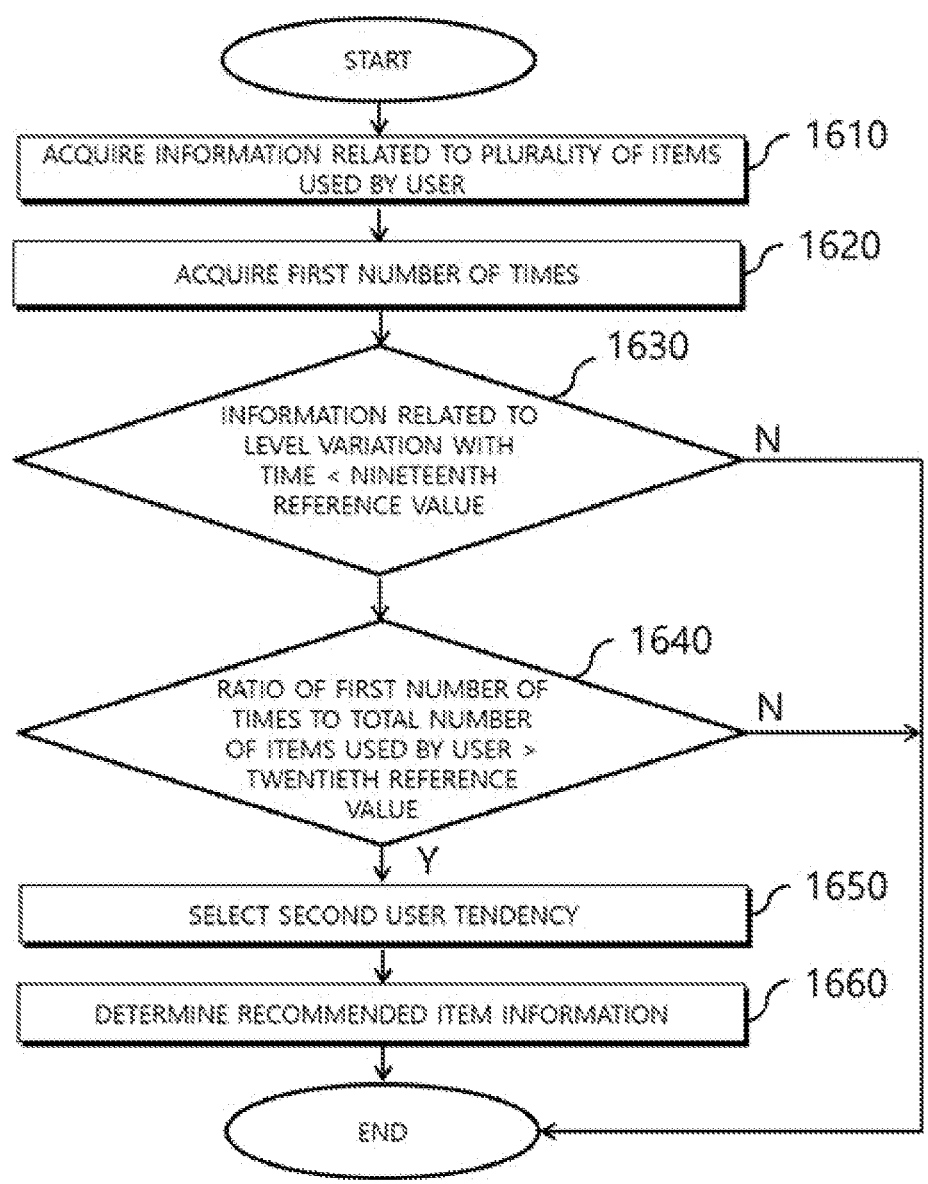
FIG. 16 is a flowchart showing a fourteenth model for providing game content information or game item information using a user's psychology according to an embodiment of the present disclosure.

FIG. 16 is a flowchart showing a fourteenth model for providing game content information or game item information using a user's psychology according to an embodiment of the present disclosure.

FIG. 16 is a flowchart for specifically describing FIG. 2 according to the fourteenth model. Users who purchase items and play a game according to a strategy have a higher rate of character level increase than other users. Also, the purchase of the items by these users is intensively performed at the beginning of signing up for a game service. Meanwhile, even though the purchase is intensively performed at the beginning of signing up for the game service, users who do not play according to the strategy tend to regret incorrect item purchasing and lose interest in the game in the early stage. The server 100 may provide these users with an opportunity to make up for misjudgments in the early stage.

The server 100 may perform an operation of acquiring information related to a plurality of items used by the user from the item usage information (1610) in order to perform the operation of selecting the user's tendency information (220), which is shown in FIG. 2. Also, the server 100 may perform an operation of acquiring, as a first number of times, the number of pieces of item information other than predetermined item information among a plurality of pieces of item information used by the user on the basis of the information related to the plurality of items used by the user (1620). The predetermined item information, which is previously determined information, may be stored in the memory of the server 100. A predetermined item may refer to an item with high efficiency. That is, the server 100 may acquire, as the first number of times, the number of times an item with low efficiency is used among the plurality of pieces of item information used by the user.

The server 100 may perform an operation of determining whether information related to a level variation with time, which is acquired from the character information, is lower than a nineteenth reference value (1630).

The nineteenth reference value may refer to a threshold value used to determine a user's tendency. The nineteenth reference value may be a predetermined value. That is, the server 100 may use the nineteenth reference value prestored in the memory. However, the present disclosure is not limited thereto. The server 100 may determine the nineteenth reference value on the basis of a variety of information stored in the database. The server 100 may determine the nineteenth reference value differently depending on the user and over time. For example, the server 100 may determine, as the nineteenth reference value, the average of level variations with time of other users.

When the information related to the level variation with time is lower than a nineteenth reference value, the server 100 may perform an operation of determining whether the ratio of the first number of times to the total number of items used by the user is higher than a twentieth reference value (1640). As described above, the first number of times may indicate the number of times an item with low efficiency is used among the plurality of pieces of item information used by the user. The server 100 may compute the ratio of the first number of times to the number of items used by the user.

The twentieth reference value may refer to a threshold value used to determine a user's tendency. The twentieth reference value may be a predetermined value. That is, the server 100 may use the twentieth reference value prestored in the memory. However, the present disclosure is not limited thereto. The server 100 may determine the twentieth reference value on the basis of a variety of information stored in the database. The server 100 may determine the twentieth reference value differently depending on the user and over time. For example, the server 100 may determine, as the twentieth reference value, the ratio of the number of pieces of item information other than the predetermined item information to the total number of items used by other users.

When the ratio of the first number of times is higher than the twentieth reference value, the server 100 may perform an operation of selecting the second user tendency indicating an individualistic and introverted tendency (1650). When the second user tendency is selected as the user's tendency information, the server 100 may control the user terminal to display a message related to the user's tendency or a message related to the corresponding model.

The server 100 may perform the operation of determining the recommended character information, recommended content information, or recommended item information (230), which is shown in FIG. 2, according to the fourteenth model. When the second user tendency is selected as the user's tendency information, the server 100 may perform an operation of determining, as the recommended item information, identification information of a discount voucher that can enable at least one item to be purchased with less online money than a market price (1660). The server 100 may reset the effect of an already used item and determine, as the recommended item information, identification information of an item that provides the user with online money corresponding to the value of the corresponding item.

Since the user can receive compensation for an item wrongly purchased or used by him or her, the server 100 may allow the user to continuously use the game service.

Although not disclosed in FIGS. 2 to 16, the server 100 may further perform the following operations.

The server 100 may acquire information related to the amount of online money acquired during a predetermined period of time from the online money acquisition information. The server 100 may acquire the amount of online money acquired for each unit period by dividing the amount of online money acquired during the predetermined period of time by the predetermined period.

The server 100 may acquire information related to the amount of online money used during a predetermined period of time from the online money usage information. The server 100 may acquire the amount of online money used for each unit period by dividing the amount of online money used during the predetermined period of time by the predetermined period.

The server 100 may compute a turnover value by dividing the amount of online money used for each unit period by the amount of online money acquired for each unit period. The turnover may represent cash flow information.

The server 100 may acquire information related to a play time per day from the play information. Also, the server 100 may acquire information related to the character's experience points from the character information. The server 100 may acquire information related to the character's experience points per play time on the basis of the information related to the character's experience points.

The server 100 may acquire user information corresponding to the sixth model on the basis of Equation 3 below.

$$CF = \log(TO+a)/\text{sum}(\log(TOk+a)) - Ppd/\text{sum}(Ppdk)*w4 + Xpp/\text{sum}(Xppk)*w5 \quad \text{[Equation 3]}$$

User Information Corresponding to Sixth Model

Here, the user information corresponding to the sixth model may be acquired on the basis of the user's cash flow information. Also, the user information corresponding to the sixth model may be acquired on the basis of information such as the user's play time or the experience points of the user's character. TO represents the turnover of the user to be analyzed. Tok represents the turnover of all the users. The log value of the turnover of all the users may be added by sum( ) function. "a" may be any constant. Ppd represents a play time per day of the user to be analyzed. Ppdk represents play times per day of all the users. The play time per day of all the users may be added by sum( ) function. w4 may be a weight. Xpp may represent information related to a character experience points per play time of the user to be analyzed. Xpp may represent a character experience points per play time of all the users. The character experience time per play time of all the users may be added by sum( ) function. w5 may be a weight.

The server 100 may standardize CF including cash flow information. For example, an appropriate constant may be added to a CF value to prevent the CF value from becoming a negative number. Also, the server 100 may compute the CF value for each user to match the maximum value to 100,000 points. Also, the server 100 may express the CF values for all the users with 0 to 100,000 points in a proportional manner. The server 100 may sort the users on the basis of the CF values.

The server 100 may classify a user whose CF value is within the top x % as a user having high online money usage. The server 100 may determine, as the recommended item information, identification information of an item capable of increasing the amount of acquired online money for a user corresponding to the sixth model. Also, the server 100 may determine, as the recommended content information, identification information of content that provides online money for a user who corresponds to the sixth model and who has a high online money usage.

The present disclosure has been particularly shown and described with reference to various embodiments. Those skilled in the art should understand that various changes in form and details may be made therein without departing from the essential characteristics of the present invention. Therefore, the embodiments described herein should be considered from an illustrative aspect rather than from a restrictive aspect. The scope of the present invention should be defined not by the detailed description but by the appended claims, and all differences falling within a scope equivalent to the claims should be construed as being encompassed by the present invention.

The embodiments can be written as computer programs and can be implemented in general-use digital computers that execute the programs using a computer-readable recording medium. Examples of the computer-readable recording medium may include storage media such as magnetic storage media (e.g., ROMs, floppy disks, hard disks, etc.), optical recording media (e.g., CD-ROMs, DVDs, etc.), etc.

What is claimed is:

1. A method of operating a server for recommending game content based on user information received from a game service provider server to prevent a user from quitting the game, the method comprising:
    collecting raw data for the user including game metadata, gameplay records and data related goods obtainable through play;
    transform values of the raw data into standardized values that can be processed by the game service provider server using a predetermined algorithm;
    transform a structure of a game database into a standardized structure of the game database;
    extracting user log data including login information, character information, item usage information, billing information, play information, online money acquisition information, and online money usage information of a user from the standardized values stored in the standardized structure of the game database;
    storing the extracted user log data in another database;
    selecting the user's tendency information from among a plurality of pieces of tendency information on the basis of at least one piece of the extracted user log data;

determining recommended character information, recommended content information, or recommended item information on the basis of the user's tendency information; and controlling a user terminal, used by the user to display the recommended character information, the recommended content information, or the recommended item information, wherein the selecting the user's tendency information comprises:

determining information related to a ratio of a number of times the user plays in a Player Versus Player (PvP) mode to a total number of times the user plays on the basis of the number of times the user plays in the PvP mode, which is acquired from the play information;

determining whether information related to the ratio is higher than a first reference value out of first to twenty-third reference values;

determining whether information related to a win rate of the user in the PvP mode, which is acquired from the play information, is lower than the second reference value in response to determination that the information related to the ratio is higher than the first reference value; and selecting a first user tendency indicating a social and extroverted tendency in response to determination that the information related to the win rate is lower than the second reference value, wherein the determining the recommended character information, the recommended content information, or the recommended item information comprises determining, as the recommended character information, the recommended content information, or the recommended item information, identification information of characters, content, or items which are used by other users who have a higher win rate in the PvP mode than the user when the first user tendency is selected as the user's tendency information.

2. The method of claim 1, wherein the selecting the user's tendency information comprises:

acquiring a number of times the user plays one of a plurality of characters owned by the user from the play information;

acquiring an amount of online money used for an item that changes an appearance of the character from the online money usage information;

determining whether information related to a number of characters owned by the user, which is acquired from the character information, is lower than the third reference value;

determining whether information on a ratio of the number of times the user plays the character to a total number of times the user plays is higher than the fourth reference value;

determining whether information related to the ratio of the amount of online money used for the item that changes the appearance of the character to the total amount of online money used by the user is higher than the fifth reference value in response to determination that the information related to the number of characters owned by the user is lower than the third reference value and the information on the ratio is higher than the fourth reference value; and selecting a second user tendency indicating an individualistic and introverted tendency in response to determination that the information related to the ratio of the amount of online money used for the item that changes the appearance of the character to the total amount is higher than the fifth reference value, wherein the determining the recommended character information, the recommended content information, or the recommended item information comprises determining identification information of content or an item related to a character used by the user as the recommended content information or the recommended item information when the second user tendency is selected as the user's tendency information.

3. The method of claim 1, wherein the selecting the user's tendency information comprises:

acquiring information related to a use time of first content that provides online money from the play information;

acquiring information related to a use time of second content that is available only a predetermined number of times per day from the play information;

determining whether information related to the use time of the first content of the user is higher than the sixth reference value;

determining whether information related to the use time of the second content is lower than the seventh reference value in response to determination that the information related to the use time of the first content of the user is higher than the sixth reference value; and selecting a third user tendency indicating an individualistic and extroverted tendency in response to determination that the information related to the use time of the second content of the user is lower than the seventh reference value, wherein the determining the recommended character information, the recommended content information, or the recommended item information comprises determining identification information of the second content or identification information of content other than the first content as the recommended content information when the third user tendency is selected as the user's tendency information.

4. The method of claim 1, wherein the selecting the user's tendency information comprises:

determining whether information related to a number of times the user is billed, which is acquired from the billing information, is lower than the eighth reference value;

determining whether information on the number of times the user has failed while playing first content, which is acquired from the play information, is higher than the ninth reference value in response to determination that the information related to the number of times the user is billed is lower than the eighth reference value; and selecting a third user tendency indicating an individualistic and extroverted tendency in response to determination that the information related to the number of times the user has failed while playing the first content is higher than the ninth reference value, wherein the determining the recommended character information, the recommended content information, or the recommended item information comprises determining identification information of second content different from the first content as the recommended content information when the third user tendency is selected as the user's tendency information.

5. The method of claim 1, wherein the selecting the user's tendency information comprises:

acquiring the user's total play time from the play information;

acquiring level information of the user's character from the character information;

determining whether efficiency information acquired based on the total play time and the level information of the character is lower than the tenth reference value;

determining whether information related to an amount charged to the user, which is acquired from the billing information, is higher than the eleventh reference value in response to determination that the efficiency information is lower than the tenth reference value; and selecting a third user tendency indicating an individualistic and extroverted tendency in response to determination that the information related to the amount charged to the user is higher than the eleventh reference value, wherein the determining the recommended character information, the recommended content information, or the recommended item information comprises determining identification information of a discount voucher allowing at least one item to be purchased with less online money than a market price as the recommended item information and determining identification information of content for which additional compensation is set as the recommended content information when the third user tendency is selected as the user's tendency information.

6. The method of claim 1, wherein the selecting the user's tendency information comprises:

acquiring an amount of acquired online money from the online money acquisition information;

acquiring an amount of used online money from the online money usage information;

determining whether information related to the user's average play time per day, which is acquired from the play information, is lower than the twelfth reference value;

determining whether information related to experience points acquired per the user's play time, which is acquired from the play information, is greater than the twenty-first reference value in response to determination that the information related to the user's average play time per day is lower than the twelfth reference value;

determining whether information related to a ratio of the amount of used online money to the amount of acquired online money is higher than the thirteenth reference value in response to determination that the information related to the experience points acquired per the user's play time is greater than the twenty-first reference value; and selecting a third user tendency indicating an individualistic and extroverted tendency in response to determination that the information related to the ratio of the amount of used online money to the amount of acquired online money is higher than the thirteenth reference value, wherein the determining the recommended character information, the recommended content information, or the recommended item information comprises determining identification information of an item for increasing an online money acquisition rate as the recommended item information when the third user tendency is selected as the user's tendency information.

7. The method of claim 2, wherein the selecting the user's tendency information further comprises:

determining whether information related to the number of times the user has failed while playing content, which is acquired from the play information, is higher than the fourteenth reference value when the second user tendency is selected;

determining whether a character used by the user is changed in response to determination that the information related to the number of times the user has failed while playing the content is higher than the fourteenth reference value;

maintaining the user's tendency information at the second user tendency in response to determination that the character used by the user is not changed; and changing the user's tendency information from the second user tendency to a third user tendency indicating an individualistic and extroverted tendency in response to determination that the character used by the user is changed, wherein the determining the recommended character information, the recommended content information, or the recommended item information further comprises:

determining identification information of content or an item related to one of a plurality of characters owned by the user as the recommended content information or the recommended item information when the user's tendency information is maintained at the second user tendency; and determining identification information of a character, content, or an item related to the plurality of characters owned by the user as the recommended character information, the recommended content information, or the recommended item information when the user's tendency information is changed to the third user tendency.

8. The method of claim 1, wherein the determining the recommended content information or the recommended item information comprises determining identification information of a character, content, and an item available only within a period from a login time to a logout time as the recommended character information, the recommended content information, or the recommended item information when a deviation of the login time of the user during a predetermined period of time or a deviation of the logout time of the user during the predetermined period of time, which is acquired from the login information, is lower than the twenty-second reference value.

9. The method of claim 1, wherein the selecting the user's tendency information comprises:

determining whether information related to the user's play time during a predetermined period of time, which is acquired from the play information, is higher than the fifteenth reference value;

determining whether information related to the user's item usage, which is acquired from the item usage information, is lower than the sixteenth reference value;

selecting a second user tendency indicating an individualistic and introverted tendency in response to determination that the information related to the user's play time during the predetermined period of time is higher than the fifteenth reference value and the information related to the user's item usage is lower than the sixteenth reference value; and selecting a third user tendency indicating an individualistic and extroverted tendency in response to determination that the information related to the user's play time during the predetermined period of time is lower than the fifteenth reference value and the information related to the user's item usage is higher than the sixteenth reference value, wherein the determining the recommended character information, the recommended content information, or the recommended item information comprises:

determining identification information of content that provides at least one character or item to the user as the recommended content information when the second user tendency is selected as the user's tendency information; and determining identification information of the at least one item or the at least one character as the recommended item information or the recommended character information when the third user tendency is selected as the user's tendency information.

10. The method of claim 1, wherein the selecting the user's tendency information comprises:

acquiring information about a first character currently being used by the user from the character information;

computing a ratio of users who use the first character to all the users on the basis of the information about the first character; and selecting a second user tendency indicating an individualistic and introverted tendency when the ratio in use is lower than the twenty-third reference value, wherein the determining the recommended character information, the recommended content information, or the recommended item information comprises determining identification information of content or an item related to the first character as the recommended content information or the recommended item information when the second user tendency is selected as the user's tendency information.

11. The method of claim 1, wherein the selecting the user's tendency information comprises:

determining whether information acquired based on a number of characters owned by the user, which is acquired from the character information, is higher than the seventeenth reference value; and selecting a second user tendency indicating an individualistic and introverted tendency in response to determination that the information acquired based on the number of characters owned by the user is higher than the seventeenth reference value, wherein the determining the recommended character information, the recommended content information, or the recommended item information comprises determining identification information of at least one piece of content as the recommended content information.

12. The method of claim 1, wherein the selecting the user's tendency information comprises:

acquiring information related to a number of attempts to play content being performed by the user from the play information; and determining whether the information related to the number of attempts is higher than the eighteenth reference value, wherein, the determining the recommended character information, the recommended content information, or the recommended item information comprises:

acquiring information related to a strategy for the content in response determination that the information related to the number of attempts is higher than the eighteenth reference value and the second user tendency or the third user tendency is selected as the user's tendency information; and determining identification information of at least one character or at least one item as the recommended character information or the recommended item information, and the controlling the user terminal comprises controlling the user terminal to display the information related to the strategy.

13. The method of claim 1, wherein the selecting the user's tendency information comprises:

acquiring information related to a plurality of items used by the user from the item usage information;

acquiring, as a first number of times, a number of pieces of item information other than predetermined item information among a plurality of pieces of item information used by the user on the basis of information related to the plurality of items used by the user;

determining whether information related to a level variation with time, which is acquired from the character information, is lower than the nineteenth reference value;

determining whether a ratio of the first number of times to the total number of items used by the user is higher than the twentieth reference value in response to determination that the information related to the level variation with time is lower than the nineteenth reference value; and selecting a second user tendency indicating an individualistic and introverted tendency in response to determination that the ratio of the first number of times is higher than the twentieth reference value, wherein the determining the recommended character information, the recommended content information, or the recommended item information comprises determining identification information of a discount voucher allowing at least one item to be purchased with less online money than a market price as the recommended item information when the second user tendency is selected as the user's tendency information.

* * * * *